US008655989B2

(12) United States Patent
Ritter et al.

(10) Patent No.: US 8,655,989 B2
(45) Date of Patent: Feb. 18, 2014

(54) BUSINESS NETWORK ACCESS PROTOCOL FOR THE BUSINESS NETWORK

(75) Inventors: Daniel Ritter, Heidelberg (DE); Christoph Herrmann, Mannheim (DE); Ankur Bhatt, Eppelheim (DE)

(73) Assignee: Sap AG, Walldorf (DE)

( * ) Notice: Subject to any disclaimer, the term of this patent is extended or adjusted under 35 U.S.C. 154(b) by 293 days.

(21) Appl. No.: 13/274,204

(22) Filed: Oct. 14, 2011

(65) Prior Publication Data

US 2013/0097320 A1 Apr. 18, 2013

(51) Int. Cl.
*G06F 15/177* (2006.01)

(52) U.S. Cl.
USPC ........... 709/220; 709/227; 709/242; 709/249; 709/250; 705/348

(58) Field of Classification Search
USPC ........... 709/220, 227, 242, 249, 250; 705/348
See application file for complete search history.

(56) References Cited

U.S. PATENT DOCUMENTS

| 6,442,615 | B1 * | 8/2002 | Nordenstam et al. ......... 709/241 |
|---|---|---|---|
| 6,952,620 | B2 | 10/2005 | Cherdron et al. |
| 7,225,424 | B2 | 5/2007 | Cherdron et al. |
| 7,240,327 | B2 | 7/2007 | Singh et al. |
| 7,533,103 | B2 | 5/2009 | Brendle et al. |
| 7,565,376 | B2 | 7/2009 | Stegmann et al. |
| 7,581,204 | B2 | 8/2009 | Reeder et al. |
| 7,600,215 | B2 | 10/2009 | Cherdron et al. |
| 7,624,340 | B2 | 11/2009 | Ritter |
| 7,630,969 | B2 | 12/2009 | Ritter |
| 7,680,783 | B2 | 3/2010 | Ritter et al. |
| 7,685,568 | B2 | 3/2010 | Brendle et al. |
| 7,689,904 | B2 | 3/2010 | Ritter |
| 7,810,067 | B2 | 10/2010 | Kaelicke et al. |
| 7,810,102 | B2 | 10/2010 | Brendle et al. |
| 7,860,902 | B2 | 12/2010 | Brendle et al. |
| 7,949,953 | B2 | 5/2011 | Bhatt et al. |
| 7,950,010 | B2 | 5/2011 | Goger et al. |
| 7,966,566 | B2 | 6/2011 | Ritter et al. |
| 7,987,193 | B2 | 7/2011 | Ganapam et al. |
| 8,457,996 | B2 * | 6/2013 | Winkler et al. ............. 705/7.11 |
| 2004/0236796 | A1 | 11/2004 | Bhatt et al. |
| 2004/0252121 | A1 | 12/2004 | Bhatt et al. |

(Continued)

OTHER PUBLICATIONS

U.S. Appl. No. 12/972,329, filed Dec. 17, 2010, Klein.

(Continued)

*Primary Examiner* — Michael Y Won
(74) *Attorney, Agent, or Firm* — Fish & Richardson P.C.

(57) ABSTRACT

The present disclosure describes methods, systems, and computer program products for providing access to business network data. One method includes identifying a logical graph from business network linked graph data to be transformed into a resource graph, the logical graph including at least two nodes and at least one edge connecting a pair of nodes and defining a connection between the nodes. Each node is converted into a resource. A resource graph associated with the logical graph can be generated, where generation comprises, for each identified node, associating at least one attribute associated with the identified node as a resource attribute of the corresponding resource, adding at least one node connected to the identified node via an edge in the logical graph as a resource attribute of the corresponding resource, and dissolving at least one connection between the identified node and at least one other entity in the logical graph.

20 Claims, 11 Drawing Sheets

(56) References Cited

U.S. PATENT DOCUMENTS

| | | | |
|---|---|---|---|
| 2004/0252134 | A1 | 12/2004 | Bhatt et al. |
| 2004/0255239 | A1 | 12/2004 | Bhatt et al. |
| 2007/0157167 | A1 | 7/2007 | Brendle et al. |
| 2007/0220451 | A1* | 9/2007 | Arnone et al. ............ 716/1 |
| 2008/0154854 | A1 | 6/2008 | Ritter |
| 2008/0154948 | A1 | 6/2008 | Stegmann et al. |
| 2008/0163267 | A1 | 7/2008 | Jurova et al. |
| 2008/0255865 | A1 | 10/2008 | Ritter et al. |
| 2008/0262891 | A1 | 10/2008 | Kothandaraman et al. |
| 2010/0070324 | A1 | 3/2010 | Bock et al. |
| 2010/0070946 | A1 | 3/2010 | Herrmann et al. |
| 2012/0239164 | A1* | 9/2012 | Smith et al. ............ 700/17 |

OTHER PUBLICATIONS

U.S. Appl. No. 12/938,982, filed Nov. 3, 2010, Ackermann et al.
U.S. Appl. No. 12/910,560, filed Oct. 22, 2010, Bhatt et al.
U.S. Appl. No. 12/902,978, filed Oct. 12, 2010, Hoffmann et al.
U.S. Appl. No. 12/902,988, filed Oct. 12, 2010, Liebig et al.
Github, "*reXster*," [online], <https://github.com/tinkerpop/rexster/wiki/>, retrieved Oct. 14, 2011, 2 pages.
Fielding, Thomas, "*Architectural Styles and the Design of Network-based Software Architectures*", [online], <http://www.ics.uci.edu/~fielding/pubs/dissertation/top.htm.>, 2000, retrieved Oct. 14, 2011, 180 pages.
Facebook Developers, "*Graph API*," [online], <.http://developers.facebook.com/docs/reference/api/>, retrieved Oct. 14, 2011, 6 pages.

* cited by examiner

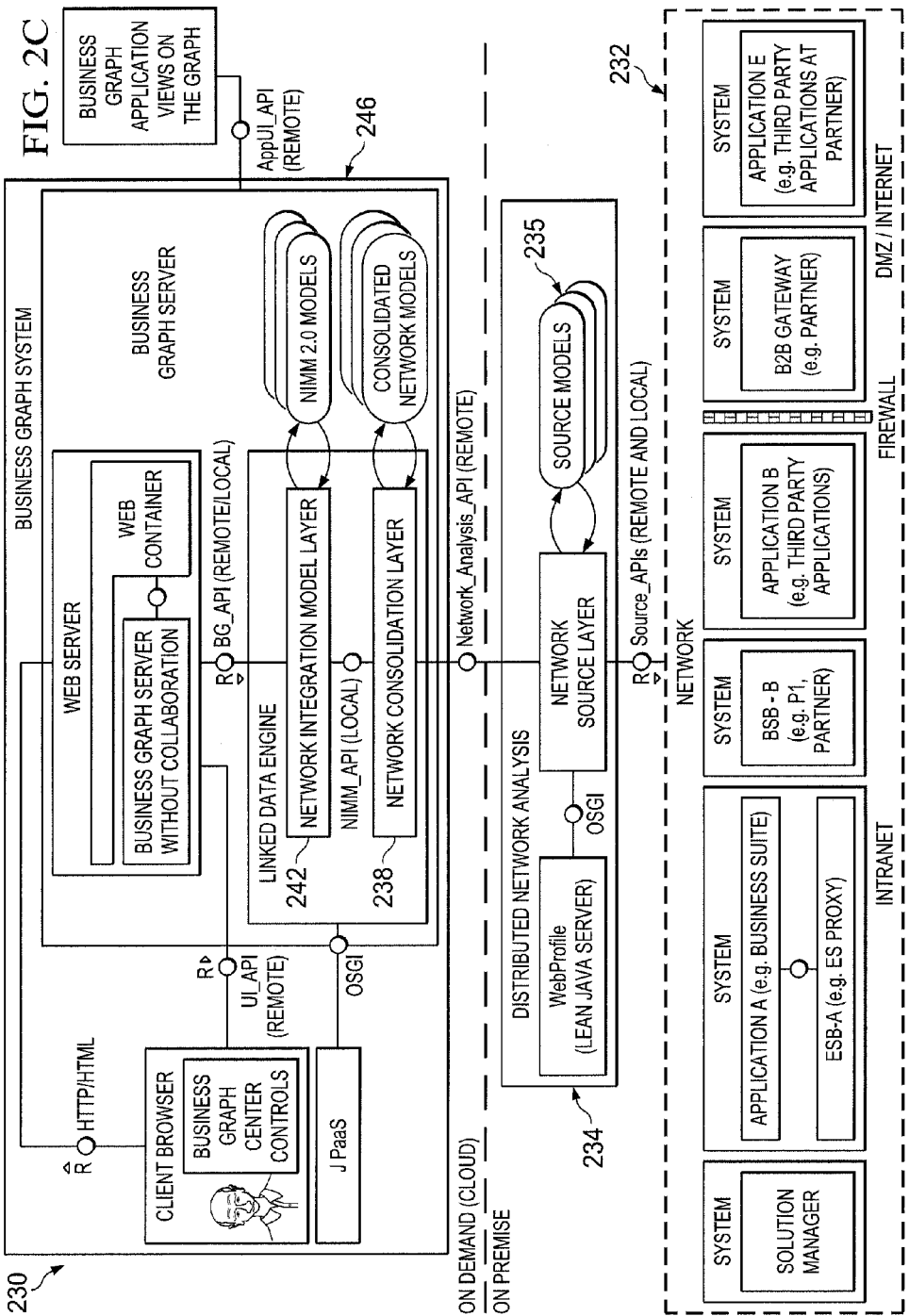

BUSINESS NETWORK ACCESS PROTOCOL FOR THE BUSINESS NETWORK

TECHNICAL FIELD

The present disclosure relates to computer program products, computer systems, and computer implemented methods for providing a generic interface for accessing and interacting with data associated with linked data.

BACKGROUND

Business networks occur in many aspects of commerce. Each business network includes a set of participants, such as people, organizations, companies, who collaborate in various ways to conduct business. For example, the business involves manufacturing, storing, distributing or servicing goods, or delivering a product or service to a customer. Many of such participants have implemented enterprise resource planning (ERP) systems and other application systems for these purposes, to support their internal processes. For example, cross-organizational activities related to service delivered by the business network can interface with (or run within) application systems of one or more participants. Some business network participants may use additional information systems and information technology (IT)-based process orchestrations to deliver the service.

Business processes running end-to-end in a business network are executed on local systems of various participants. Today, participants who wish to enable end-to-end business network operations and provide visibility into business network performance may need to implement costly, risky and time-consuming projects to deliver process integration into local applications. In the context of business networks, this business-IT dilemma may be exaggerated by a disconnect within participating organizations between, on the one hand, their individual IT situation, and on the other, their business language. The cost and complexity is further multiplied by the number of participants who must collaborate in a business network to achieve a common goal. This number ranges from fifty (at the low end) to many hundred in some enterprise settings. For each participant, the integration, operation and visibility needs to be addressed case-by-case, covering the end-to-end flow of business information and values, from activities within the private domain of one participant (e.g., the solicitation of a quote) to the partner's corresponding business activities (e.g., the confirmation of an order) and follow-up activities by related participants (e.g., production orders, shipping advice, etc.). Each partner-to-partner collaboration in the network needs to be implemented against autonomously designed information systems and integration technologies.

Generally, bringing information system support to a business network requires that mutual knowledge be acquired about the global view of the business network, or in a sense, of the network fabric. Most often, the required knowledge for such an integration is distributed over multiple people in the organization. Typically, no single person has an end-to-end understanding of the business processes, organizations and IT landscape of their own organization, let alone those of all the involved participants. This lack of knowledge and the disconnect between participants (and their business and IT organizations) hinders the effective delivery of information system support for the collaborative business activities and business network lifecycle events. For example, effective support requires managing the evolution of the information system and business process operations, such as: on- or off-boarding participants, modifying process steps or information exchange, creating process variants due to regional or contractual variations, changing contracts regarding business rules and service level agreements (SLAs), ensuring continuous operations, and performing business optimization.

Some existing solutions perform modeling of business processes. For example, Business Process Modeling Notation (BPMN) is a graphical notation that depicts the steps in a business process.

SUMMARY

The present disclosure describes methods, systems, and computer program products for providing access to business network data. One method includes identifying a logical graph from business network linked graph data to be transformed into a resource graph, the logical graph including at least two nodes and at least one edge connecting a pair of nodes and defining a connection between the nodes. Each node is converted into a resource. A resource graph associated with the logical graph can be generated, where generation comprises, for each identified node, associating at least one attribute associated with the identified node as a resource attribute of the corresponding resource, adding at least one node connected to the identified node via an edge in the logical graph as a resource attribute of the corresponding resource, and dissolving at least one connection between the identified node and at least one other entity in the logical graph.

While generally described as computer implemented software embodied on tangible media that processes and transforms the respective data, some or all of the aspects may be computer implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DESCRIPTION OF DRAWINGS

FIG. 2C provides an illustration of an example architectural overview of the example business trading web.

DETAILED DESCRIPTION

Figure 1:
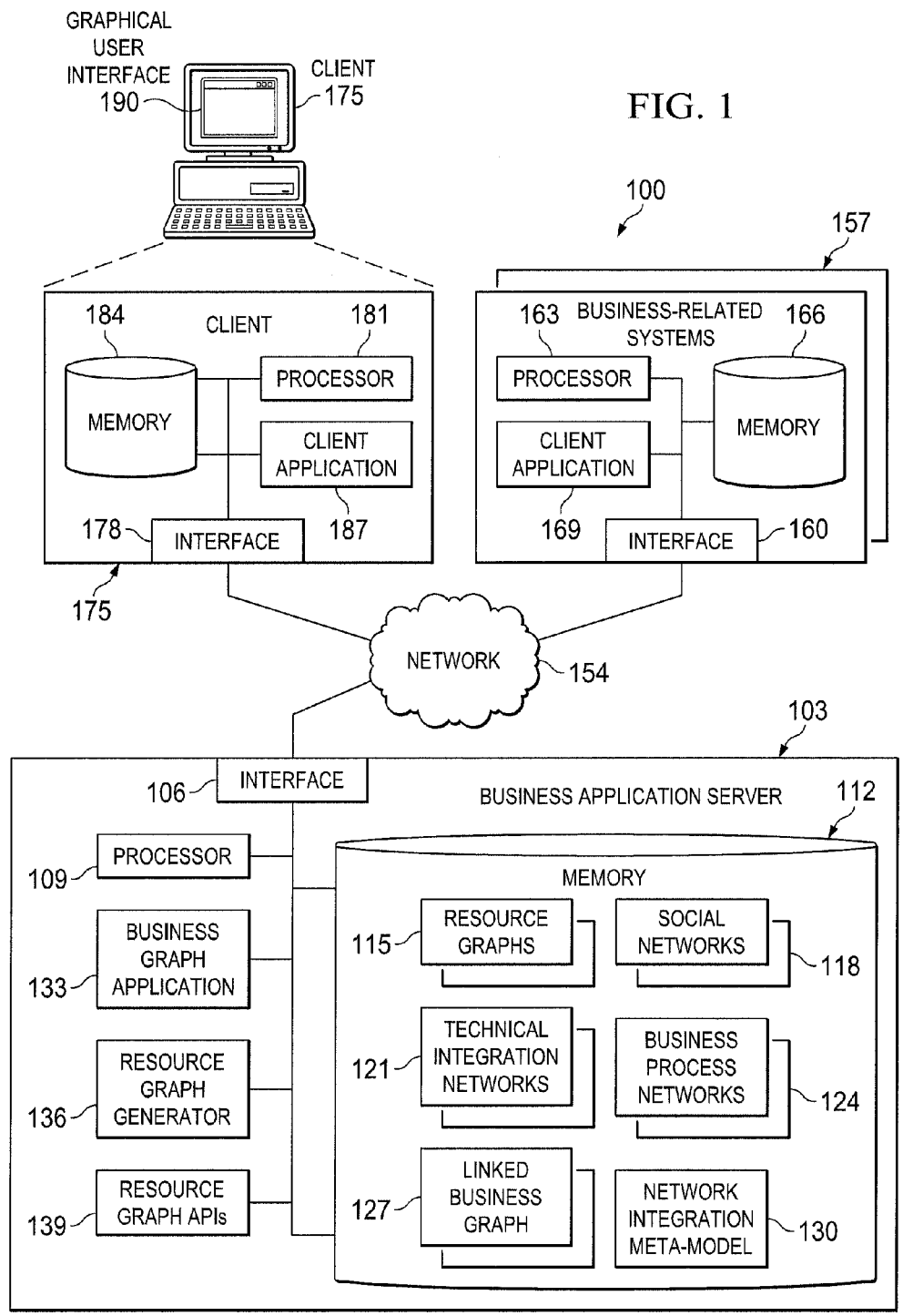
FIG. 1 illustrates an example environment for implementing various features of a system providing a generic interface for accessing and interacting with data associated with linked data graphs using a resource graph.

This disclosure generally relates to computer program products, computer systems, and computer implemented methods for providing a generic interface for accessing and interacting with data associated with linked data graphs. The interface can provide generic access to all nodes of a corresponding graph data model, such that changing entities or the structure of the underlying data model does not require code changes to the interface. Data can be added, changed, removed, and queried in a uniform manner. The interface is also efficient—through it, large data sets can be transferred, allowing implementations of the interface to scale well on large data sets while allowing users to perform precise and restrictive querying to avoid the transfer of unnecessary data. The interface is meant to be easily usable by users, consumers, and automated systems, allowing for both manual exploration and for defined, automated analytics. Further, the interface, as it exposes an underlying graph structure, can enable graph-related algorithms and functions useable through various calls via the interface itself.

In some instances, data from various technical integration, business, and social aspects, among others, may be combined into a linked graph structure, where the linked graph structure provides connections describing relationships between various defined graphs and models defined independently for the various data aspects. Co-pending U.S. patent application Ser. No. 12/902,988, incorporated by reference herein, in the area of business network management, describes how data from these different aspects can be discovered, analyzed, and algorithmically linked, in some cases, across enterprises, to a business network. The collected and linked information can then be integrated into a common representation called a Network Integration Meta-Model, or NIMM, which is described in co-pending application Ser. No. 12/902,978, incorporated by reference herein. Various user interface (UI) and application-based consumers can access the data in the NIMM using applications called business graph applications (BGAs). BGAs can be used for various purposes, including business network management-related operations for visualizations of business networks with different views on the business and technical integration data. BGAs providing this functionality can access the data via remote access and allow seamless navigation, querying, and write operations on the corresponding data set. Non-UI-based BGA solutions may include accessing business network data in the NIMM to combine that data with integration or business instance data for monitoring or analytical applications performing calculations on the underlying data. To provide seamless reading and writing, remote access to the business network data in the NIMM can be provided by a corresponding application programming interface (API) that provides various solutions including, but not limited to:

Providing access to different contexts: Accessing technical integration, business, and social artifacts and resources in a common way within their respective contexts (e.g.,
viewing information associated with a business participant within both its social and technical integration contexts).

Complex structural traversal: Allowing traversal through a multi-relational hyper graph that combines information between two or more linked graphs and/or data sets (e.g., linked graphs providing relationships and connections in both a technical aspect and a business process aspect).

Complex structural unification: Allowing access of different structural and modeling artifacts in a single interface (i.e., sub-object trees, model object forest, hyper graph structures, and lists).

Extensions and semantic graphs: Allowing users to build their own semantic shortcuts between model entities, which may become a part of the underlying and associated graph.

Setting theoretic access: Allowing complete access of information in a 1:1, 1:n, and n:m relations as accessible resources.

Providing configurable entry points into the associated data.

Allowing flexibly configured, ad-hoc clustering of the graph to compute entry points or thematic sub-networks for visualization and access.

Allowing for and providing graph queries.

Supporting the common operations of CREATE, READ, UPDATE, and DELETE for working on the graph.

The present disclosure provides an interface and back-end derived graph capable of making these solutions possible. Specifically, a method for deriving a resource-based graph, or resource graph, from a previously-existing linked graph is provided, where the resource graph provides a uniform graph and description of two or more linked data sets associated with specific perspectives on data, such as social, technical integration, and business process networks and relationships. To define the resource graph, the resources in a previously-existing linked data graph are identified, with various operations and derivations performed to realize a corresponding resource graph that can be operated on using various algorithms, filters, operators, and other techniques via the uniform interface.

FIG. 1 illustrates an example environment 100 for implementing various features of a system for providing a generic interface for accessing and interacting with data associated with linked data graphs using a resource graph derived from the linked data graphs. The illustrated environment 100 includes, or is communicably coupled with, a business application server 103, at least one business-related system 157, and at least one client 175. At least some of the communications between the business application server 103, the at least one business-related system 157, and the at least one client 175 may be performed across or via network 154. In general, environment 100 depicts an example configuration of a system for identifying various social networks 118, technical integration networks 121, and business process networks 124, among others, to create at least one linked business graph 127 illustrating a defined relationship and interconnectedness between the plurality of networks. The linked business graph 127 (or any other suitable graph or data set representing relationships between two or more networks) can be analyzed and modified to create one or more resource graphs 115 (i.e., via resource graph generator 136). The resource graphs 115 can be accessed by various business graph applications 133, either through local calls from a local user at the business application server 103 or by remote requests received through the resource graph APIs 139 (and through network 154). Using the business graph application 133, various operations, filters, and other actions can be performed upon the resource graphs 115 themselves, as well as the underlying networks upon which the resource graphs 115 are based. The environment 100 is an example and, in alternative implementations, the elements illustrated in FIG. 1 may be included in or associated with different and/or additional servers, clients, systems, networks, and locations other than those as shown. For example, one or more of the components illustrated within the business application server 103 may be located in multiple or different servers, cloud-based networks, or other locations accessible to the business application server 103 (e.g., either directly or indirectly via network 154).

In general, the business application server 103 is any server or system that stores, manages, and executes functionality associated with the business graph applications 133 and one or more resource graphs 115. The business application server 103 may execute one or more business graph applications 133, as well as other related applications, programs, and modules. For example, the business application server 103 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the business application server 103 may store a plurality of applications, while in other instances, the business application server 103 may be a dedicated server meant to store and execute resource graph-related functionality. In some instances, the business application server 103 may comprise a web server or be communicably coupled with a web server, where one or more of the business graph applications 133 associated with the business application server 103 represent web-based (or web-accessible) applications accessed and executed through requests and interactions received via clients 175, which can use their respective client applications 187 operable to interact with the programmed tasks or operations of the corresponding resource graph-related functionality and/or the one or more business graph applications 133.

At a high level, the business application server 103 comprises an electronic computing device operable to receive, transmit, process, store, or manage data and information associated with the environment 100. The business application server 103 illustrated in FIG. 1 can be responsible for receiving application requests from one or more clients 175 (as well as any other entity or system interacting with the business application server 103, including desktop or mobile client systems, as well as communications from one or more business-related systems 157), responding to the received requests by processing said requests in the campaign-related functionality and/or the associated business graph application 133, and sending the appropriate responses from the appropriate component back to the requesting client 175 or other requesting system. Components of the business application server 103 can also process and respond to local requests from a user locally accessing the system. Accordingly, in addition to requests from the clients 175 illustrated in FIG. 1, requests associated with a particular component may also be sent from internal users, external or third-party customers, business processes, and other associated business applications, as well as any other appropriate entities, individuals, systems, or computers. In some instances, the business graph application 133 and/or the resource graph-related functionality may be web-based applications executing functionality associated with a networked or cloud-based business process.

As used in the present disclosure, the term "computer" is intended to encompass any suitable processing device. For example, although FIG. 1 illustrates a single business application server 103, environment 100 can be implemented using any number of servers, as well as computers other than servers, including a server pool. Indeed, the business application server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated business application server 103 may be adapted to execute any operating system, including Linux, UNIX, Windows, Mac OS, or any other suitable operating system.

In the illustrated implementation of FIG. 1, the business application server 103 includes an interface 106, a processor 109, a memory 112, a business graph application 133, a resource graph generator 136, and a set of resource graph APIs 139. In some instances, the business application server 103 and its illustrated components may be separated into multiple components executing at different servers and/or systems. For example, while FIG. 1 illustrates the business graph application 133 and the resource graph-related modules and applications as separate components, other example implementations can include the various resource graph-related modules and applications within the business graph application 133, as a part of the business graph application's functionality, while also illustrating the business graph application 133 and/or the resource graph-related modules and applications within a separate system. Thus, while illustrated as a single component in the example environment 100 of FIG. 1, alternative implementations may illustrate the business application server 103 as comprising multiple parts or portions accordingly.

FIG. 1 depicts a server-client environment, but could also represent a cloud computing, or on-demand, network. Various other implementations of the illustrated environment 100 can be provided to allow for increased flexibility in the underlying system, including multiple business application systems 103 performing or executing one or more additional or alternative instances of the business graph application 133 and the resource graph-related modules and applications for one or more different platforms, as well as multiple instances of the business graph application 133 and the resource graph-related functionality. In those instances, the different business application servers 103 may communicate with each other via a cloud-based network or through the connections provided by network 154.

The interface 106 is used by the business application server 103 to communicate with other systems in a client-server or other distributed environment (including within environment 100) connected to the network 154 (e.g., one of the clients 175, one or more clients 175, one or more business-related systems 157, as well as other systems communicably coupled to the network 154). The interface 106 generally comprises logic encoded in software and/or hardware in a suitable combination and operable to communicate with the network 154. More specifically, the interface 106 may comprise software supporting one or more communication protocols associated with communications such that the network 154 or the interface's hardware is operable to communicate physical signals within and outside of the illustrated environment 100.

Generally, the business application server 103 may be communicably coupled with a network 154 that facilitates wireless or wireline communications between the components of the environment 100 (i.e., between the business application server 103 and different business-related systems 157 and/or one or more clients 175), as well as with any other local or remote computer, such as additional clients, servers, or other devices communicably coupled to network 154, including those not illustrated in FIG. 1. In the illustrated environment, the network 154 is depicted as a single network, but may be comprised of more than one network without departing from the scope of this disclosure, so long as at least a portion of the network 154 may facilitate communications between senders and recipients. In some instances, one or more of the components associated with the business application server 103 may be included within the network 154 as one or more cloud-based services or operations.

The network 154 may be all or a portion of an enterprise or secured network, while in another instance, at least a portion of the network 154 may represent a connection to the Internet. In the illustrated example, at least a portion of the network 154 includes a portion of a cellular or mobile data network or other network capable of relaying simple message service (SMS) messages. In some instances, a portion of the network 154 may be a virtual private network (VPN). Further, all or a portion of the network 154 can comprise either a wireline or wireless link. Example wireless links may include 802.11a/b/g/n, 802.20, WiMax, and/or any other appropriate wireless link. In other words, the network 154 encompasses any internal or external network, networks, sub-network, or combination thereof operable to facilitate communications between various computing components inside and outside the illustrated environment 100. The network 154 may communicate, for example, Internet Protocol (IP) packets, Frame Relay frames, Asynchronous Transfer Mode (ATM) cells, voice, video, data, and other suitable information between network addresses. The network 154 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the business application server 103 includes a processor 109. Although illustrated as a single processor 109 in the business application server 103, two or more processors may be used according to particular needs, desires, or particular embodiments of environment 100. The processor 109 may be a central processing unit (CPU), a blade, an application specific integrated circuit (ASIC), a field-programmable gate array (FPGA), or another suitable component. Generally, the processor 109 executes instructions and manipulates data to perform the operations of the business application server 103 and, specifically, the functionality associated with the corresponding business graph application 133 and the other resource graph-related modules, applications, and functionality. In one implementation, the server's processor 109 executes the functionality required to receive and respond to requests and instructions from the clients 175 and business-related systems 157, as well as the functionality required to perform the operations of the associated business graph application 133 and the resource graph-related modules and applications, among others.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 109 executes the corresponding business graph application 133 and other resource graph-related components stored on the associated business application server 103. In some instances, a particular business application server 103 may be associated with the execution of two or more business graph applications 133 and/or resource graph-related modules (and other related components), as well as one or more distributed applications executing across two or more servers executing the functionality associated with the business application server 103. In some instances, the business application server 103 may execute other, non-resource graph-related applications and functionality.

At a high level, each business graph application 133 is any application, program, module, process, or other software that may execute, change, delete, generate, or otherwise manage information associated with a particular business application server 103, and in some cases, at least some of the various linked graphs 127, networks, and resource graphs 115 accessible to the application 133 within environment 100. In general, business graph applications 133 allow various views on particular data and aspects of that data to be viewed and/or presented upon request. In some instances, a particular business graph application 133 may operate in response to and in connection with one or more requests received from an associated client 175, a particular business-related system 157, or another remote client or system. Additionally, a particular business graph application 133 may operate in response to and in connection with one or more requests received from other business applications and/or business graph applications external to the business application server 103. In some instances, the business graph application 133 may request additional processing or information from an external system or application. In some instances, each business graph application 133 may represent a web-based application accessed and executed by remote clients 175 (or other systems) via the network 154 (e.g., through the Internet, or via one or more cloud-based services associated with the business application 133). Further, while illustrated as internal to the business application server 103, one or more processes associated with a particular business application 133 may be stored, referenced, or executed remotely. For example, a portion of a particular business graph application 133 may be a web service that is remotely called, while another portion of the business graph application 133 may be an interface object or agent bundled for processing at a remote system (not illustrated), a particular business-related system 157, or a particular client 175 (e.g., the client application 187). Moreover, any or all of a particular business graph application 133 may be a child or sub-module of another software module or enterprise application (not illustrated) without departing from the scope of this disclosure. Still further, portions of the particular business graph application 133 may be executed or accessed by a user working directly at the business application server 103, as well as remotely at a corresponding client 175 (or another suitable remote location). In some instances, the business graph application 133 may be an application related to or part of an enterprise or other larger application. In some instances, the business graph application 133 may be a part of an enterprise resource planning (ERP) system, a customer relationship management (CRM) system, or other business application suite or platform.

Business graph application 133 may also be applications for linking specific information and providing that information with a broader integration and business context, as well as allowing and providing the graph visualizations and presentations. In some instances, the business graph application 133 may use a linked graph engine and application-specific functionality by allowing one or more access and/or extension points within the related applications:

Use the existing business graph centers and applications, including those center's or application's graph visualization functionality and associated controls.

Embed business graph functionality into a user interface.

Access linked data through a resource oriented architecture, such as the resource graph.

Collaborate on data in a collaboration platform

Define one or more consolidation programs and/or logic, including custom rules.

Display and filter raw information from the discovery process by adding, modifying or removing appropriate information.

The business application server 103 includes various other resource graph-related modules, such as the resource graph generator 136, and one or more resource graph APIs 139. The various components, while illustrated individually, may be grouped together as a single component in alternative implementations, as well as components or parts of the business graph application 133.

The resource graph generator 136 can be an application, module, or other software operable when executed to analyze one or more linked graphs 127 and/or the network integration meta-model 130 to derive the one or more corresponding resource graphs 115. In some instances, the resource graph generator 136 can update the one or more resource graphs 115 upon a user request, while in other instances, the resource graph generator 136 can generate and/or update the corresponding resource graphs 115 automatically in response to one or more triggering events. In some instances, the triggering events may include a determination of updates associated with one or more of the linked graphs 127 and/or the network integration meta-model 130, a determination that a pre-determined amount of time has passed since the previous update, as well as other suitable triggering events. Administrators and other users with appropriate authorization may be able to define when and how the resource graph generator 136 updates one or more resource graphs 115 and/or how the resource graph generator 136 monitors and manages its various associated graphs and networks.

The resource graph APIs 139 provide one or more interfaces for accessing the stored resource graphs 115 and their corresponding data in a uniform way. In some instances, API calls and requests from clients 175 may be received through network 154 and the interface 106, allowing the resource graph APIs 139 to process, interpret, and perform one or more resource graph-related actions associated with the request. In some instances, the resource graph APIs 139 may provide remote access to functionality associated with the business graph application 133, allowing remote clients 175 and other systems to access information and visualizations associated with one or more resource graphs 115 of the business application server 103 without needing additional knowledge of the internal operations of the corresponding business graph application 133. The resource graph APIs 139 can allow access to some of the operations and functionality described above, including providing access to different contexts, providing complex structural traversal and unification, allowing for extensions and semantic graphs, setting theoretic access to data, providing configurable entry points to associated data, allowing flexibly configured, ad-hoc clustering of the data, allowing for and providing graph queries, and supporting common operations for working on the graph, among others.

FIG. 1 further includes memory 112. Memory 112 of the business application server 103 can store data and program instructions, business objects, graphs, models, portions of and references to business network definitions and parameters, information relevant to one or more resource graphs 115, and other information. Memory 112 may include any memory or database module and may take the form of volatile or non-volatile memory including, without limitation, magnetic media, optical media, random access memory (RAM), read-only memory (ROM), removable media, or any other suitable local or remote memory component. The memory 112 may store various objects, object models, and data, including classes, frameworks, applications, backup data, business objects, jobs, web pages, web page templates, database tables, and any other appropriate information including any parameters, variables, algorithms, instructions, rules, constraints, or references thereto associated with the purposes of the business application server 103 and associated functionality. In some implementations, including a cloud-based system, some or all of memory 112 may be stored remote from the business application server 103, and communicably coupled to the business application server 103 for usage. Some or all of the elements illustrated within memory 112 may be stored external to memory 112. Additionally, memory 112 may be distributed among a plurality of physical and/or virtual locations. As illustrated, memory 112 includes a plurality of resource graphs 115, information defining or representing one or more social networks 118, information defining or representing one or more technical integration networks 121, information defining or representing one or more business process networks, one or more linked graphs 127, and one or more network integration meta-models 130.

Resource graphs 115 represent a resource oriented architecture-based view on the corresponding and various business networks. The resource graphs 115 are described in detail throughout the present disclosure. In general, the resource graphs 115 allow set theoretic access to the business network, where the business network represents a combination of various networks, including one or more social networks 118, technical integration networks 121, and business process networks 124. The linked graphs 127 represent connected graphs illustrating the connections and relationships between two or more social networks 118, technical integration networks 121, and/or business process networks 124, among others. Different types of networks may also be included in or referenced by a particular linked graph 127 as is appropriate and suitable to the particular implementation. The network integration meta-model 130 is described further herein, particularly in FIGS. 2A-C. In general, the network integration meta-model 130 is a consolidated and updated linked graph representing the relationships between two or more networks.

The illustrated environment 100 of FIG. 1 also includes one or more clients 175. The clients 175 may be associated with a particular business graph application business network, as well as a particular business-related system 157. Each client 175 may be any computing device operable to connect to or communicate with at least one of the business application server 103 or a particular business-related system 157 using a wireline or wireless connection via the network 154, or another suitable communication means or channel. In some instances, the client 175 may be a part of or associated with a business process involving one or more of the business applications, or alternatively, an administrator or other user associated with or interested in a particular business network. In general, each client 175 includes a processor 181, an interface 178, a client application 184, a graphical user interface (GUI) 190, and a memory 187. In general, the client 175 comprises an electronic computer device operable to receive, transmit, process, and store any appropriate data associated with the environment 100 of FIG. 1. It will be understood that there may be any number of clients 175 associated with, or external to, environment 100. For example, while illustrated environment 100 includes a single client 175, alternative implementations of environment 100 may include multiple clients communicably coupled to the one or more of the systems illustrated. In some instances, one or more clients 175 may be associated with administrators of the environment, and may be capable of accessing and interacting with the settings and operations of the business graph application 133, one or more business applications executed at the business application server 103, particular operations, interactions, or applications executed at one of the business-related systems 157, and/or other components of the illustrated environment 100. Additionally, there may also be one or more additional clients 175 external to the illustrated portion of environment 100 capable of interacting with the environment 100 via the network 154. Further, the terms "client" and "user" may be used interchangeably as appropriate without departing from the scope of this disclosure. Moreover, while each client 175 is described in terms of being used by a single user, this disclosure contemplates that many users may use one computer, or that one user may use multiple computers.

The GUI 190 associated with each client 175 may comprise a graphical user interface operable to, for example, allow the user of a client 175 to interface with at least a portion of the business graph application 133 and/or resource graph APIs 139 and their associated operations and functionality. Generally, the GUI 190 provides the particular user with an efficient and user-friendly presentation of business data provided by or communicated within the system. The GUI 190 may comprise a plurality of customizable frames or views having interactive fields, pull-down lists, and buttons operated by the user. For example, the GUI 190 may provide interactive elements that allow a user to interact with a particular component within and/or external to environment 100. Different portions of the corresponding component's functionality may be presented and accessible to the user through the GUI 190, such as through a client application 184 (e.g., a web browser). Generally, the GUI 190 may also provide general interactive elements that allow a user to access and utilize various services and functions of a particular component. In some instances, the client application 184 may be used to access various portions of different business-related systems 157 or the business application server 103. In some instances, the client application 184 may be an agent or client-side version of the business graph application 133, a business application executing at the business application server 103, or other suitable component. The GUI 190 may present the information of the client application 184 for viewing and interaction. In general, the GUI 190 is often configurable, supports a combination of tables and graphs (bar, line, pie, status dials, etc.), and is able to build real-time portals, where tabs are delineated by key characteristics (e.g., site or microsite). Therefore, the GUI 190 contemplates any suitable graphical user interface, such as a combination of a generic web browser, intelligent engine, and command line interface (CLI) that processes information in the platform and efficiently presents the results to the user visually.

As used in this disclosure, each client 175 is intended to encompass a personal computer, touch screen terminal, workstation, network computer, kiosk, wireless data port, smart phone, personal data assistant (PDA), one or more processors within these or other devices, or any other suitable processing device. For example, each client 175 may comprise a computer that includes an input device, such as a keypad, touch screen, mouse, or other device that can accept user information, and an output device that conveys information associated with the operation of one or more business graph applications 133, business applications, the resource graph APIs 139, an application associated with the business-related systems 157, and/or the client 175 itself, including digital data, visual information, or the GUI 190. Both the input and output device may include fixed or removable storage media such as a magnetic storage media, CD-ROM, or other suitable media, to both receive input from and provide output to users of client 175 through the display, namely, the GUI 190. The client's processor 181, interface 178, and memory 187 may be similar to or different from those described in connection with the other components illustrated in FIG. 1, although alternative implementations of one or more of these components may be used, as well as implementations where additional components may also be included.

The business-related systems 157 can represent one or more systems associated with one or more of the networks monitored by the business application server 103, such as a particular social network 118, technical integration network 121, or business process network 124. In general, one or more portions of those networks may be executed by or associated with a particular business-related system 157. Information associated with each business-related system 157 can be collected at the business application server 103 by an appropriate agent or set of agents local to the business-related system and/or remote therefrom, with the collected data combined to create one or more of the models and graphs illustrated within memory 112 of the business application server 103. Each business-related system 157 may include one or more interfaces 160, processors 163, client applications 169, and/or memory 166. These components may be similar to or different from those described in association with the business application server 103 and/or the client 175.

Figure 2A:
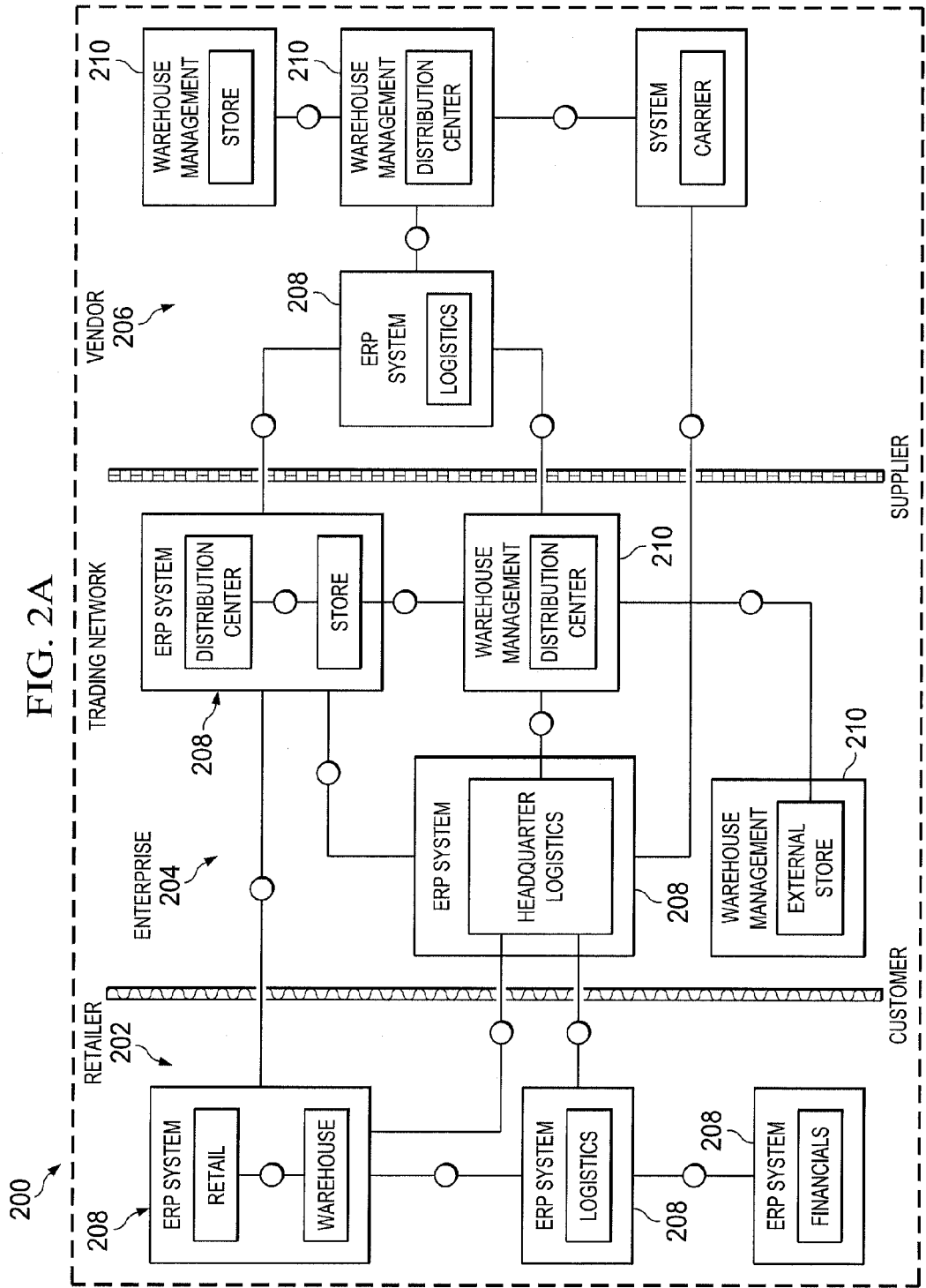
FIG. 2A illustrates an example of a system comprising information in several aspects of the overall system.

FIG. 2A illustrates an example of a system comprising information in several aspects of the overall system. In today's world, enterprise software customers may have large, complex and heterogeneous information technology (IT) landscapes. As new technology emerges or circumstances change, new machines, applications and services are added and removed. Consequently, solutions from different vendors with different life-cycle requirements are running side by side. These solutions can be interconnected or even interdependent, yet subject to different IT, middleware and application practices. Managing, analyzing, and changing such complex landscapes requires great effort and cannot be done in a centralized way.

From a different point of view, these landscapes are also the platform for further complex business processes involving resources, people and IT infrastructure inside a company, as well as partners and customers with their respective IT landscapes and business processes. These networks can span across enterprises, as well as large traditional enterprise landscapes, and are called business trading networks. An example business trading network 200 is depicted in FIG. 2A. The example contains customers 202 (left side), suppliers 206 (right side) and the enterprise 204 (middle). Business processes and technical processes are intermingled to form a decentralized, complex network. Systems within the business trading network 200, such as the enterprise resource planning (ERP) systems 208 or warehouse management systems 210, can stem from different vendors, have different customizations, or have to be managed differently due to different IT strategy policies. Additionally, some processes may also require domain-specific knowledge, for example, logistics and warehouse knowledge. The networks making up the business trading network 200, therefore, can only be managed with great effort, if at all.

To help large companies or entities make visible, operate, and optimize their business trading networks, enterprise software developers are developing various solutions to make the business trading network explicit, provide visibility to the business-to-business (B2B) relations of a networked enterprise, ease the end-to-end lifecycle behind integration developments and applications, and allow collaboration on different interlinked information for faster execution. To do so, a business trading network web can be created to take all business, social, and technical integration information, as well as other relevant information, from the actual business trading network 200 and integrates it into a single view, the linked business graph (e.g., element 127 of FIGURE). This discovered, "as-is" graph can then be enhanced with "to-be" aspects as a blueprint of the actual network. To do that, integration architects or business users can contextualize and enrich the network with business semantics (e.g., business tags, business document entities, etc.) and enhance the network by defining policies, SLAs, and possibly write back changes into the original domains. In addition to the "as-is" and "to-be" functionality, an example business trading web can allow users to monitor the business trading network and collaboratively resolve business and integration exceptions/events.

To discover the "as-is" business trading network, an example business trading web deploys independent software agents on the customer landscape. These software agents are specialized to discover different aspects of a trading network and report it to a corresponding business graph system. Different agents can be created for different systems, which allow a continuous extension of the discovery possibilities within any suitable environment.

Figure 2B:
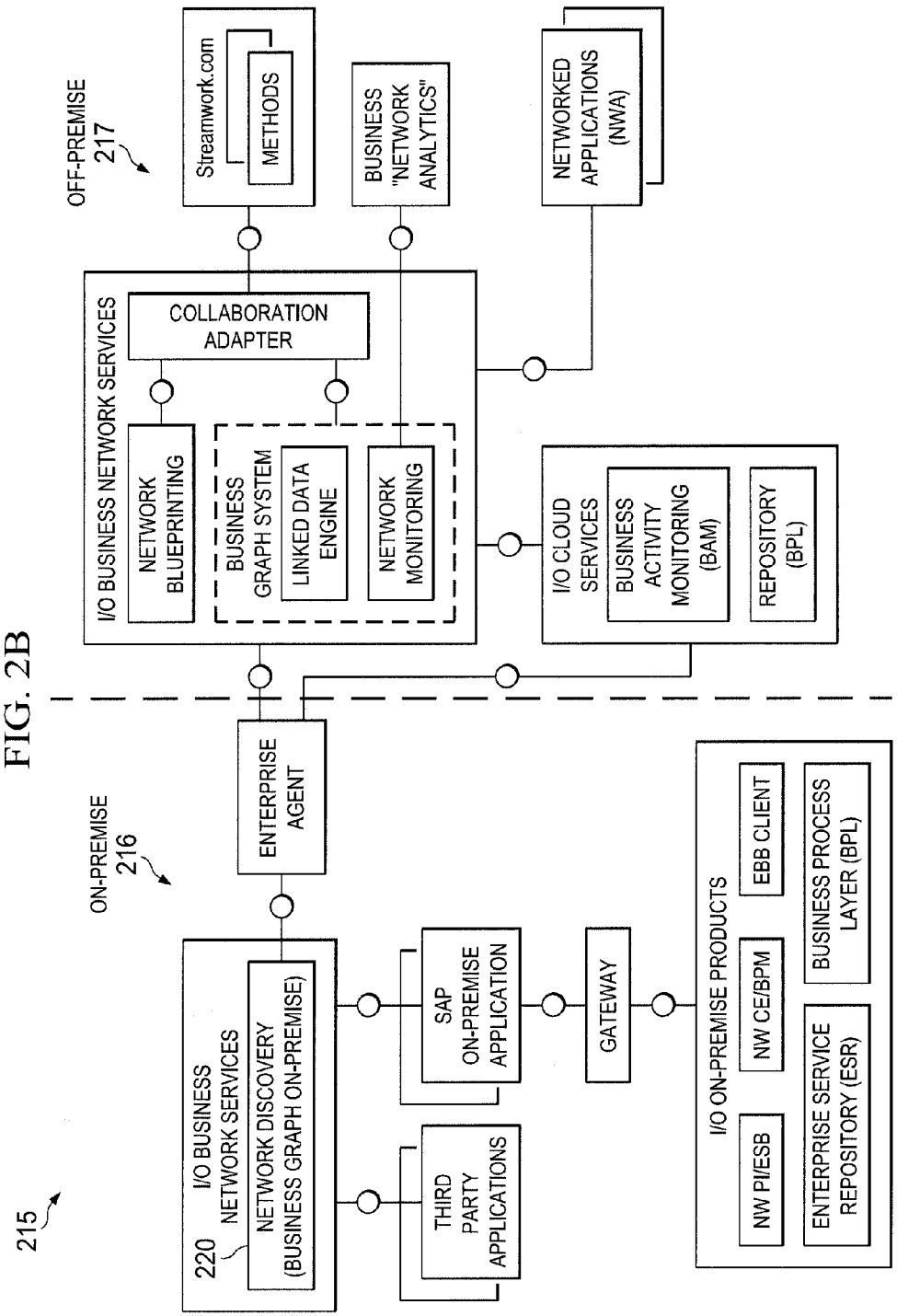
FIG. 2B provides an example illustration of the overall integration of a business trading web.

The agent design can be used to deploy the business trading web as an on-demand (or cloud-computing) solution, meaning the major functionality does not have to be on-premise (or locally deployed on the customer side). FIG. 2B provides an example illustration 215 of the overall integration of the business trading web. The on-premise part 216 of the illustrated example 215 contains the network discovery 220, which deploys the agents that discover the on-premise products. Off-premise 217 contains the business graph system that receives the discovered data, consolidates the discovered data, and modifies that data with the "to-be" enrichment artifacts mentioned above. Different cloud services and other applications access the business graph system to read and write into the consolidated enriched business trading network.

From an architectural perspective, the example business trading web is divided in four different layers. FIG. 2C provides an illustration of an example architectural overview 230 of the example business trading web. The network 232 represents an actual customer network. As illustrated, the network 232 contains different types of applications and systems that make up the technical landscape or contain information about the business processes in the particular business trading web. Each of these applications may require a specific agent that can interact with it and extract the necessary information. For more sophisticated managing scenarios, the agents may also need to have write access to the systems in order to modify settings, parameters, and other values.

All agents are deployed from the first layer, the distributed network analysis layer 234. This is the on-premise executable of an example business trading web and can be implemented, for example, in a runtime of a Java component system. Each agent can report its findings to the distributed network analysis layer 234, which creates different unified source models 235 from that information. These source models 235 can use the same unified language to describe the network. From the distributed network analysis layer 234, the source models 235 are then sent into the cloud, where the next layer is ready to process them.

The second layer is the network consolidation layer 238. Contrary to the illustrated distributed network analysis layer 234, the network consolidation layer 238 is deployed into the cloud and part of the business graph server 246. The business graph server 246 also contains the third and fourth layers described herein, which together provide all cloud functionality of the example business trading web.

The network consolidation layer 238 receives the source models 235 created during the network analysis and consolidates them into one global business graph which represents the entire physical view of the network. The network analysis is important to look for matches, similarities and relations to construct the actual view of the network with applications and integration buses deployed on systems integrating with each other. The data discovered by the agents may be redundant and incoherent, which means that the data does not translate into an automatic view of the network. The aim of the analysis is therefore to identify equivalences and integration flows between systems, and to create a holistic network view. An example of a consolidation task would be the following: System A could call system X "ABC," whereas system B calls system X "123." The consolidation should then understand that "ABC" and "123" are actually the same system and create the unified consolidated model with that information. Another task carried out by the consolidation is checking for consistency rules in order to determine if the discovered data is valid or not. To ensure the validity of the knowledge base, a distributable, schema- and content-based validation is hooked into the inbound processing of the source models 235.

The resulting consolidated model is called the network integration meta model, which is stored in the third layer, the network integration model layer 242. The network integration model layer 242 contains the final consolidated "as-is" graph that was discovered, inferred, and validated so far. It is the persistent storage layer which provides the data to all applications that want to access the business trading web, mainly, but not limited to, the user interface. Internally, it uses the network integration meta-model 2.0 (NIMM) 243 as the model to store all information. In order to enhance the model with "to-be" blueprint aspects, the NIMM 243 can also be manually enriched and modified in this layer. These enrichments provide the basis for defining a business context for technical information present in a consolidated network model, creating views of the network for collaboration, to get transparency and visibility of operations, and blue-printing and implementing new integration scenarios starting with the network view of the landscape. Among other enhancements, the present disclosure describes a new interface to the NIMM 243.

The last layer of the illustrated business trading web 230 is the business graph graphical user interface. It provides web-based access to the information contained in the NIMM 243. The actual user interface front-end that runs in the browser may be developed in a Model-View-Presenter (MVP) pattern.

The business graph visualization can be based on, for example, Raphael, JQuery and HTML5.

The NIMM 243 is the centerpiece of the network integration layer 242 in the business graph system 230. The NIMM 243 describes entities and relationships of entities which are part of a business trading network within and across enterprises. This business trading network represents the data, document, and control flows between distributed applications, middleware, and business partners for discovery, enrichment, operation, change and optimization purposes. The NIMM 243 is an extension and specialization of the Business Process Modeling Notation (BPMN) version 2.0. BPMN is a standard for defining, visualizing, and exchanging business procedures within and across enterprises. Restated, the BPMN enables business analysts and implementation specialists to use the same language for designing and, consequently implementing end-to-end business processes. In a very detailed view, these business processes could be a set of activities a business entity has to perform in order to achieve a certain goal.

Figure 2D:
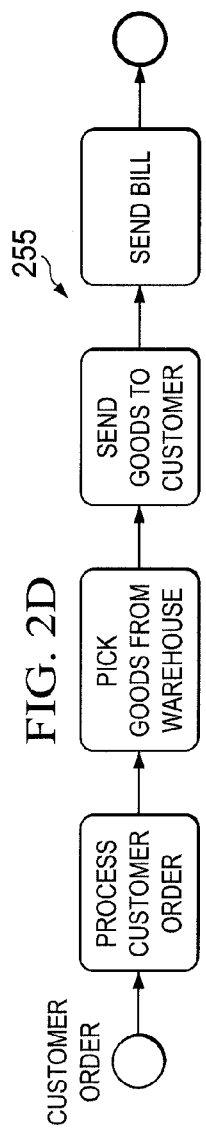
FIG. 2D illustrates an example process associated with a business trading web.
Figure 2E:
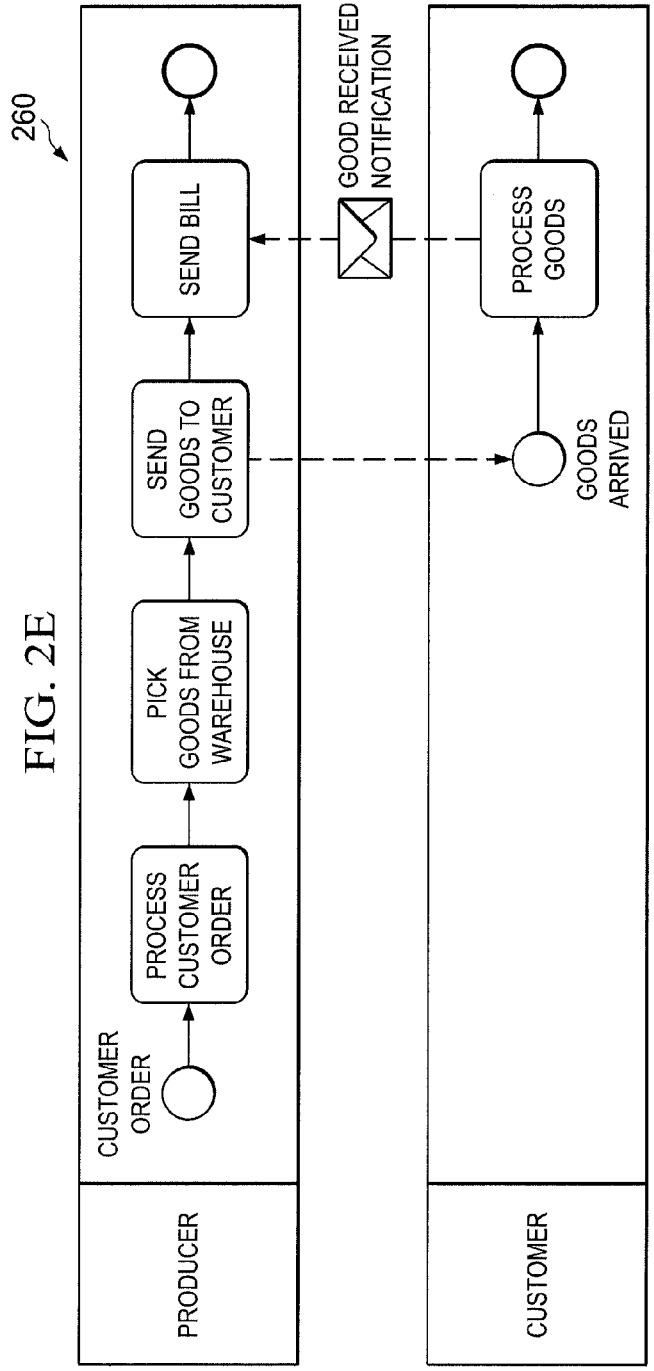
FIG. 2E illustrates a more complex example process associated with a business trading web.

FIG. 2D illustrates a simple example process 255 for a customer order, the picking of the goods, the shipment, and the billing. The process 255 described, however, can be executed by a single business entity and is therefore represented as a swim lane of a pool. More complex business processes require interaction between different pools. FIG. 2E depicts such a collaboration process 260. The pools in this case are the customer and the producer. The flows between two pools are called message flows, and the whole diagram is called a "collaboration diagram." In order to represent a business trading network, however, these collaboration diagrams provide too much detail. Therefore, a conversation diagram is used which only contains the pools (also called Participants) and the message flows between them in order to provide a bird's eye perspective of the different conversations that relate to the domain.

The NIMM 243 focuses on these conversation concepts. Through specialization and extension of the Participants and their connecting MessageFlows, it is possible to combine social, business and integration aspects of a business trading network into one common model. Since the NIMM links these different pieces of data together to form a holistic view on the whole business trading network, the concrete model instantiation is also referred to as the linked data graph. Participants can be interpreted as a graph linked together by the MessageFlows and provide additional data to the network.

Figure 3:
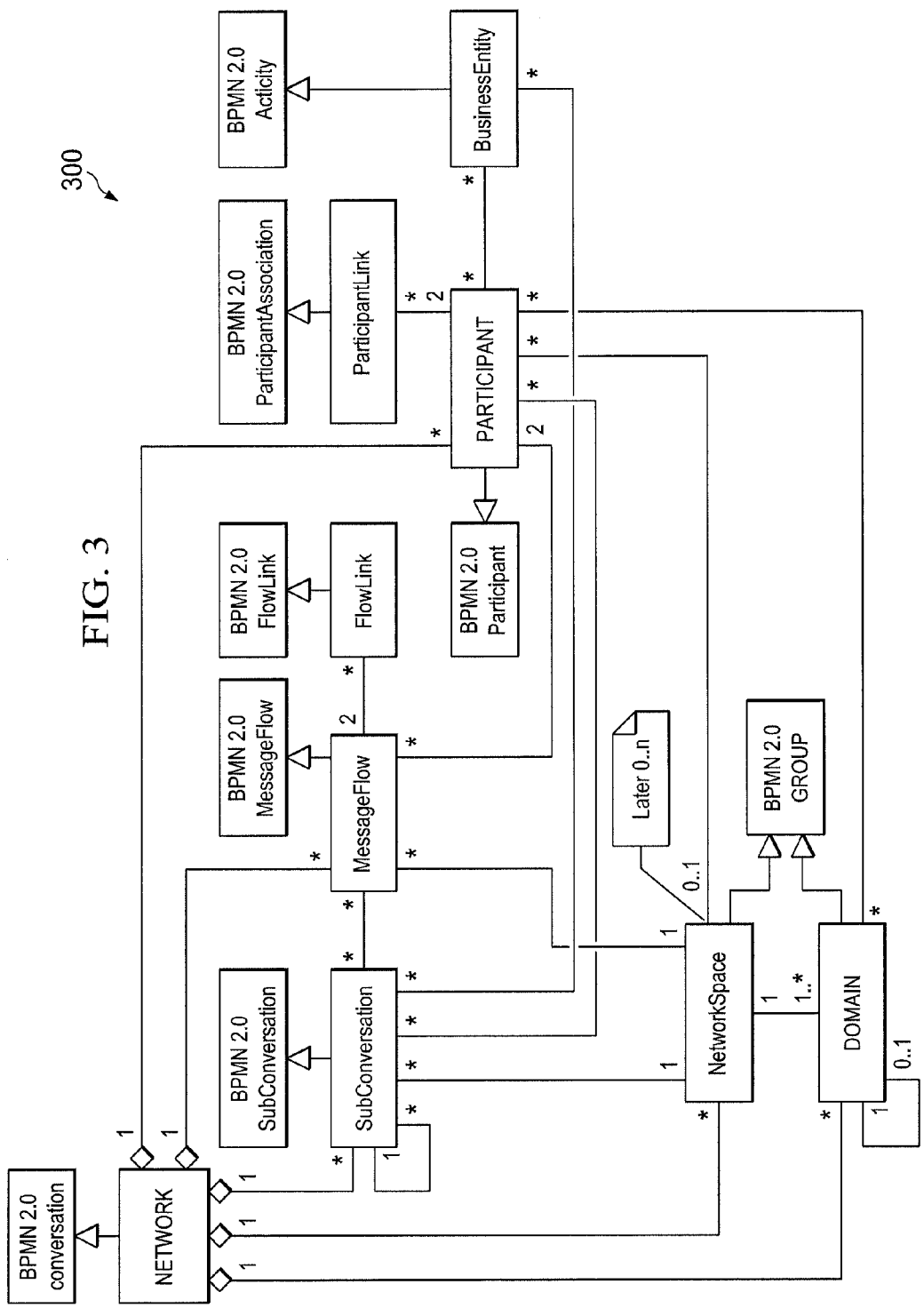
FIG. 3 provides an illustration 300 depicting the relationship between the NIMM and BPMN.

FIG. 3 provides an illustration 300 depicting the relationship between the NIMM and BPMN. Some minor entities of the NIMM have been omitted to reduce the complexity of the illustration. A complete list of entities can be found in the appendix of co-pending, and previously incorporated by reference, U.S. patent application Ser. No. 12/902, 978. The entities illustrated in FIG. 3 include the following:

Participant. Similar to the BPMN, the Participant is the centerpiece of the NIMM. It appears as a node in the business trading network and represents a real-world entity which has to communicate outside itself or is related to a communication held by other participants. As mentioned above, the BPMN 2.0 standard represents Participant entities as pools when considering a process level. The entity Participant has different specializations: BusinessParticipant and CommunicationParticipant with even further specializations. These very granular specializations are the reason the NIMM can represent social, business and integration perspectives in just one model.

MessageFlow. A MessageFlow defines a message exchange from a Participant to another Participant. Like a Participant, it has different specializations: BusinessFlow and CommunicationFlow, with even further specializations.

SubConversation. A SubConversation represents an aggregation of MessageFlow and/or other SubConversation. In a BPMN conversation diagram, these SubConversations are used to represent all the different types of communication and collaboration between two pools/participants.

Network. The Network is a superset of the consolidated model and all NetworkSpaces. It is a conversation diagram of all Participants, their SubConversations and MessageFlows. The content of the Network is partially computed by the network consolidation and enriched via NetworkSpaces.

NetworkSpace. A NetworkSpace represents a subset of Network entities a user wishes to work with. NetworkSpace is the entry entity for collaboration between users, e.g., sharing. Users can give access rights on action level to other users, but the Domain access rights always supersede. NetworkSpaces might be partially disjunctive from Network while the user is changing entities of a NetworkSpace as "local copy." When a NetworkSpace is published by a user, it is merged into the Network.

Domain. A Domain is a subset of Network entities built to assign access rights on action level (read, write, enrich, change, delete) by an administrator. A typical use case would be to limit access to parts of the network for certain users, for example, a logistics business specialist should not have access to human resource-relevant processes. Domains can be linked as a tree.

ParticipantLink. ParticipantLinks define an association between Participants, which refer to an identical entity, depend on each other, are copied, or have other types of association. ParticipantLinks can be seen as semantic links like "is-a," "isimplemented-by", and "is-equal-to," among others.

FlowLink. FlowLinks are used to associate MessageFlows semantically. MessageFlows are associated for two main purposes: as enrichments and enhancements in the NetworkSpace and as an assignment of real MessageFlows to BusinessFlows. The concept is closely related to ParticipantLinks.

BusinessEntity. A BusinessEntity is annotated to the SubConversation or Participant. It is a specialization of the BPMN entity artifact and adds enrichment information to the entities to which it is attached.

The present disclosure describes an interface designed to access the data provided by the NIMM 243. To do so, both RESTful interfaces and a resource oriented architecture are used. A general description and overview of RESTful interfaces and resource oriented architecture is provided herein for context before describing the interface and its ability to access the NIM 243.

The software architecture of a program or computing system is the structure or structures of the system, which comprise software elements, the externally visible properties of those elements, and the relationships among them. In other words, a particular software architecture describes a concrete finished system and how the different components of that system interact.

Contrary to the actual architecture, the architecture principals define rules, guidelines, and/or constraints that can be applied to a concrete architecture. For example, applying the principals of a client-server architecture will result in a concrete architecture that will be considered a client-server architecture. On the other hand, an actual architecture can be subject to multiple principals and resemble all of them. As a consequence, when talking about a resource oriented architecture, it is a concrete design that adheres to the resource oriented architecture principals.

Interfaces expose architectural components to the public or to other components of the same architecture. Because they expose the architecture to the outside world, interfaces and architecture are very closely interrelated. Architectural principals are often reflected in interfaces and have an impact on how the interfaces work. Interfaces define a set of methods that can be used to interact with the architecture component they expose. Such methods can return data or change internal states of the component. Methods can have additional information attached which describe the nature of the request in more detail or add scoping information. A example for interfaces and their function can be found in the interface definitions of the Java Programming Language.

For the present disclosure, the tasks could therefore be described as follows. A given architecture is to be extended with an interface. Since the interface had to adhere to the principals of a Representational State Transfer (REST) architecture, these principals had to be applied to the given architecture. During the creation of the interface, the set of constraints was extended so that the original architecture adhered to the principals of a resource oriented architecture.

REST is an architectural principal for distributed hypermedia. Hypermedia in this case means media, such as plain text, graphics, audio, video, etc., that are intertwined to reference, or "link," to each other in a non-linear way. The most prominent example of a distributed hypermedia system is the World Wide Web. In general, the following architectural principals should be applied to an architecture in order to qualify as a REST architecture: Client-Server, Statelessness, Cache, Layered System, and Uniform Interface.

Client-Server. The first principal introduces a separation of concerns, where the client is responsible for the user interface, whereas the server is responsible for the data storage. Portability, scalability and the possibility to develop the different components independently are the main benefactors of such an architectural design.

Stateless. Statelessness means that each request from a client to a server must contain all of the information necessary to understand the request—it cannot take advantage of any stored context on the server, as all session state is contained on the client. Responsibility for correct execution is given to the client side, since the server has no control whatsoever over the application flow.

Cache. A proper REST implementation demands that response data must be marked as cacheable or non-cacheable in order to improve network efficiency. Cacheable requests can be served partially or even fully from local caches and do not have to be sent over the network.

Layered System. A layered architecture means that the whole architecture is composed of different components which cannot see beyond the immediate layer with which they are interacting. This allows the reduction of overall system complexity and facilitates reuse of other services and technologies where applicable.

Uniform Interface. A REST architecture must provide a uniform interface between components. This interface should be found by applying the software engineering principles of generality. That means only a limited set of methods can be used to communicate to a component which complies to the REST architecture principals. The uniform interface is defined by four constraints: identification of resources; manipulation of resources through representations; self-descriptive messages; and hypermedia as the engine of application state. The use of a generic interface simplifies the interactions between the architectural components. Because the uniform interface is not coupled to the implementation, independent evolution of the components is encouraged.

Data retrieved through a REST interface is called a resource. Any information that can be named can be a resource: a document, an image, a temporal service (e.g., "today's weather in Melbourne"), a collection of other resources, a non-virtual object (e.g., a car, person, dog) and so on. Usually, a resource is something that can be stored on a computer and represented as a stream of bytes. In a more formal definition, a resource R is a temporally varying membership function $M_R(t)$, which for time t always maps to the same set of entities, or values. The values in the set may be resource representations and/or resource identifiers. A resource can map to the empty set, which allows references to be made to a concept before any realization of that concept exists. Some resources are static in the sense that, when examined at any time after their creation, they always correspond to the same value set. Others have a high degree of variance in their value over time.

Another requirement for a resource is its addressability. Every resource must have a unique identification. This identification is highly tied to the semantic of the resource itself. For example, the resource fastest car in the world would, at the time of the writing, map to the Bugatti Veyron Super Sport. This is a unique identifier, because there will always be only one car in the world that is the fastest. But it also expresses a semantic. It is important to use the semantic as the definition of a resource, because just looking at the actual data it contains might not be enough. As an example, a resource may be identified as Bugatti Veyron Super Sport. The resource would map to the same data as the current fastest car in the world, yet it does not represent the same idea and is therefore not the same resource.

This abstract definition of a resource provides generality by encompassing many sources of information without artificially distinguishing them by type or implementation. It also allows late binding of the reference to a representation, enabling content negotiation to take place based on characteristics of the request. For example, data of the Bugatti Veyron could be sent in different languages, depending on the language definition of the request. Thirdly, such an abstract definition allows an author to reference the concept rather than some singular representation of that concept, thus removing the need to change all existing links whenever the representation changes, for example, when there is a new fastest car in the world.

Because resources are defined by the semantic concept they describe, it is possible to have different representations of the same resource. An example would be a text which is deliverable in various languages and in different file formats, while the resource itself only defines the abstract semantic of A text on narwhals. More precisely, a representation consists of data, metadata describing the data and, in some instances, metadata to describe the metadata (usually for the purpose of verifying message integrity). Metadata are name-value pairs, where the name corresponds to a standard that defines the value's structure and semantics. Response messages to a request may include both representation metadata and resource metadata: information about the resource that is not specific to the supplied representation, for example, if the resource is cacheable or when it will expire. Returning to the constraints imposed on the REST interface:

Identification of resources. As mentioned before, resources are defined by semantics which are closely tied to their identification. A REST interface must provide ways to identify resources. This is an important aspect when thinking about the methods an interface exposes. The identification of the resources allows scoping of a method by answering the question "on what data should it be applied."

Manipulation of resources through representations. Since resources are only abstract semantic concepts which cannot change, their actual data content must be handled by representations. A REST interface must therefore not return a specific type of data, but be open to retrieve data in various formats.

Self-descriptive messages. Because of the stateless nature of the REST architecture and the possibility for a variety of representational formats for any given resource, messages sent through the REST interface should contain all metadata to describe the nature of the message itself. Such information does include the resource identifier, the representation format and the method that is called upon. This can, however, be extended to include client details, caching policies, etc.

Hypermedia as the engine of application state. The application state can be understood as the knowledge of the process executing component as to "where the program is in its execution." In the stateless architecture of the REST, there is no such information saved on the server side. The client is the executing unit that sends specific requests to the server. The engine of the application state defines the possibilities as to where the program execution will go next. For example, imagine a web browsing session—the current website is the current application state. The links on the website represent different paths on where the execution will go next. Because hypermedia is defined by the fact, that is interlinked media, these links can be used as the engine of the application state.

As a set of architectural principals, REST is very general. In particular, it is neither specifically tied to the World Wide Web nor dependent on the standard Internet technologies such as HTTP or URLs. Resource oriented architecture defines a REST architecture which is explicitly tied to the standard web technologies and provides a well-defined set of best practices for a concrete REST/ROA implementation.

Every resource must be uniquely identifiable. As described, the identification and the semantic meaning of a resource are usually coupled very tightly. The resource oriented architecture does not deviate from that approach. Today's standard technology to identify any resource in the context of the Internet and beyond is the Uniform Resource Locator (URL). The complete definition of URLs can be found in RFC 1738 of the IETF (Berners-Lee et al., 1994). In general, URLs are written as follows:

<scheme>:<scheme-specific-part>

A URL contains the name of the scheme being used (for example, HTTP) followed by a colon and then a string, the <scheme-specific-part>. This part's interpretation depends on the scheme itself. For the present disclosure, the focus will be on URLs created for the HTTP schema. In accordance with RFC 1738, a HTTP URL looks as follows:

http://<host>:<port>/<path>?<searchpart>

The <host> and <port> part describe the computer on the Internet, that will respond to the request. Important for this thesis, however, are the <path> and <searchpart>. Every resource exposed on the computer <host> will be uniquely identified through a <path> and a <searchpart>. And, since we are dealing with hypermedia as resource representation, every link inside a resource must be of exactly that format, as well. The resource oriented architecture goes one step further than just introducing URLs as a resource identifier. It promotes the idea to use URLs that should have structure and vary in predictable ways. They should use the <path> to expose hierarchy and use the <searchpart> to indicate query variables that will be used as inputs to algorithm. This is also related to the idea of identification and semantic meaning of resources, and how they go hand in hand. Generally speaking, there is no universal mathematical rule on a good naming practice for resources, as a logical and structured way might be different in each context.

After being able to identify resources, the question then becomes how they should be represented. Resources can be exposed in any suitable format, including XML. The present disclosure exposes resources in the JavaScript Object Notation (JSON), a lightweight data-interchange format based on the JavaScript Programming Language. JSON itself is built on two structures: (1) a collection of name/value pairs which can also be understood as an object and (2) an ordered list of values, which can be seen as an array. An object is surrounded by curly braces, names and values are separated by a colon and distinguished from each other by a comma. A sample JSON object could look as follows:

{"name1": "value", "name2":"value2"}

An array is surrounded by square braces, all the values in the array are separated with commas:

["value", "value1"]

Values can be of type String, Integer, Boolean, another array or another object, which allows for nesting of arrays and objects to an infinite depth. Other representations may be used in alternative implementations, including Resource Description Framework (RDFa), hypertext markup language (HTML), or plain text.

As a last piece of REST architecture, the resource oriented architecture specifies the Hypertext Transfer Protocol (HTTP) as the uniform interface. HTTP is defined in RFC 2616 and is one of the most important protocols for the World Wide Web as of today. For the purpose of REST and the present disclosure, it defines a uniform interface by exposing four methods: GET, PUT, POST, and DELETE. This section will describe them as far as the scope of the present disclosure is concerned. A full definition can be found in RFC 2616.

The first method of the HTTP interface is the GET method. The GET method retrieves whatever information is identified by the Request-URL. The URL is provided as an argument to the GET request and defines the receiver of the request itself (the host part of the URL). Additionally, a GET request can contain further specifications, such as the desired representation, authorization information, or language settings. All these arguments are sent in the HTTP header. A typical HTTP request could look as follows:

```
GET /resourcepath/resource HTTP/1.1
Host: www.host.com
Accept: text/plain, text/html
```

This GET request is for URL "http://www.host.com/resourcepath/resource" and wants to have a text/plain representation returned. If that fails, a text/html representation is requested as a backup. Every GET request is acknowledged by the server with an HTTP message. This message always contains a response code, such as 200 for "ok," 404 for "not found," or 500 for "bad operation." Additionally, every HTTP response includes further header data, equal to the headers sent above. For example, the header data "content-type" specifies the actual representation type of the data in the HTTP body. The following provides a sample answer to a GET request:

```
HTTP/1.1 200 OK
Date: Wed, 24 Sep 2005 13:37:00 GMT
Last-Modified: Fri, 24 Jan 2003 01:23:45 GMT
Content-Length: 438
Content-Type: text/plain; charset=UTF-8
<Content>
```

The first line contains the status code, in this case a 200, which means "ok," or that everything went correctly. The headers sent can be referenced in RFC 2616. For the response, it is important to note the blank line before the actual content. Generally, the HTTP protocol separates message headers and body with one blank line. This can be found in all other HTTP methods, as well.

Since GET only returns a representation of the actual resource, a proper GET request is also a safe request. That means that for a proper implemented HTTP GET, the request should not have the significance of taking an action other than retrieval. A client could run the GET request n times, and the same data would always be returned with nothing on the server being changed. This is rooted in the statelessness of the REST architecture and provides the advantage that anyone can use a REST interface without having to worry that something disastrous will happen. The second important property of HTTP GET is its idempotence. Idempotence means that an operation has the same effect whether it is applied once or more than once. Since it has been established that GET is a safe operation, idempotence is included automatically because there is no effect on the server.

After the retrieval of resources has been introduced, the second method is the deletion of resources (the DELETE method). The DELETE method requests that the origin server delete the resource identified by the Request-URL. The server will usually respond with a code 200 and the deletion will be done. As a theoretical construct, the DELETE method is, like the GET method, idempotent. Deleting a resource once has the same effect as deleting the particular resource n times. A DELETE is, however, by definition not a safe method.

The HTTP PUT request is neither idempotent nor safe. The PUT method requests that the enclosed entity be stored under the supplied Request-URL. That means that for a PUT request, the client sends a representation to the server which should replace the currently existing representation. If the server does not find such a resource, it can be created and stored for the given URL. Depending on what the server did, it can either return a status of 200 (in case the resource was modified), or 201, in case the resource was created.

The last relevant HTTP method is the POST method. POST is used to create a resource on the server, without having to specify the URL under which the new resource should be created. This is the main difference compared to the PUT request. While PUT always needs to know the final URL during request time, the POST request is sent to a "handler" URL, which then creates the resource and returns a status of 201 with the "location" header referencing to the storage location of the newly-created resource.

A possible REST/resource oriented interface and architecture should therefore be:

A web service. The service should comply with the commonly accepted standards on the Internet such as TCP/IP, client-server, HTTP or URLs.

Centered around resources. Resources and their representation are the essential key to a resource oriented architecture. Resources should be expressed as hypermedia to enable the client to be the engine of application state.

Addressable. Every resource must be addressable via its own URL. URLs should be built in a logical, consistent and intuitive manner. The location to the resource should go into the <path> of the HTTP URL, whereas possible query arguments are left for the <query> section of the HTTP URL.

Stateless. All communication with the server must be independent of the previous conversation.

With a uniform interface. HTTP in its original understanding should be used as the standard interface to the REST architecture. This provides a widely accepted and understood uniform interface with added benefits such as cacheabilty, statelessness, etc. The content part of the HTTP messages should not be used to include the operation description, but only the necessary data to carry out the method specified by HTTP.

Graphs in the context of this thesis are not the graphs of functions or statistical graphs, but the graphs used in graph theory which contain nodes that are connected to each other via edges. Specifically, a graph is a data structure composed of dots (called nodes or vertices) and lines (called edges). These dots and lines of a graph can be organized into complex arrangements. A graph's ability to express objects and their relationships to one another allows for a large number of things to be modeled as graphs.

In a mathematical sense, an undirected graph $G=(V;E)$ contains a set of vertices V and a set of edges E, with every edge $e \in E$ in G having two (not necessarily different) vertices of the set V attached to it. The sample graph 400 of FIG. 4A contains the nodes V={1; 2; 3; 4; 5; 6; 7; 8; 9; 10} and the edges E={{1; 3}; {2; 3}; {3; 4}; {4; 5}; {4; 6}; {5; 6}; {7; 9}; {7; 8}1. There are a few properties to the graph to be defined.

Adjacency. Two nodes $u, v \in V$ that are connected through an edge e={u; v} are called adjacent. As an example, node 1 and 3 in the sample graph are adjacent to each other.

Degree. The degree deg v of a node $v \in V$ is the number of edges originating from that particular node. Edges which start and end at v are counted twice. For example, node 7 in the graph has a degree of 5.

Isolated nodes. An isolated node is a node without any edges and therefore a degree of 0. In the sample graph, node 13 is such an isolated node.

Figure 4A:
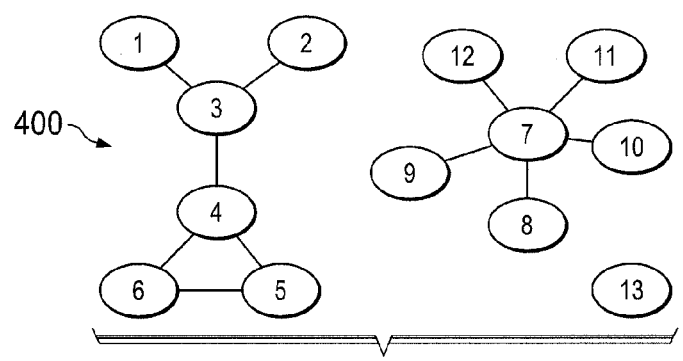
FIG. 4A-E provide examples of graphs and graph-related concepts.

Connectedness. A graph is said to be connected if there is a connection between every node in the graph with every other node in the graph. The sample graph 400 of FIG. 4A is not connected.

Component/segment. A component is formed by a number of connected nodes. For example, the sample graph 400 has three components. Throughout this disclosure, the components will also be referred to as segments or network segments.

Bridge. Any edge that cannot be removed without creating two components out of one is called a bridge. In sample graph 400, the edge {3; 4} would be such a bridge, as would all the edges originating from node 7.

Hubs. If a network has a relatively small number of nodes that are connected to many other nodes, these nodes are called hubs. For every network, the threshold at which degree a node is to be considered a hub varies. A case could be made for node 7 in graph 400 to be a hub.

The sample graph 400 in FIG. 4A is an undirected graph, meaning all edges can originate and end in either of both nodes to which they are attached. It is also a vertex-labeled graph, since the nodes have labels on them. There are more sophisticated graphs which have unique properties that go beyond the properties of such a graph. The following graph types are considered in the present disclosure, although other graph types could be used:

- Undirected graph. A typical graph G=(V;E) as defined before. This is the original dots and lines and nothing more.
- Directed graph. Every edge e∈E has a fixed order of nodes and therefore denotes an orientation. In other words, every edge has a defined origin and a defined destination, and would therefore be drawn with an arrow.
- Connected graph. In a connected graph, every node $v_i \in V$ is reachable from every node $v_j \in V$ through n>0 edges, e∈E.
- Vertex-labeled graph. A vertex-labeled graph does have a label for every node in the graph in order to identify them.
- Vertex-attributed graph. Contrary to the vertex-labeled graph, the vertex-attributed graph has key/value pairs attached to its nodes. This is a way to append non-relational metadata to a node.
- Edge-labeled graph. Edges can be labeled to denote the way in which two nodes are related, for example, friendship, ownership, etc.
- Edge-attributed graph. Just as the vertex-attributed graph, an edge-attributed graph has key-value pairs attached to its edges to represent non-relational metadata.
- Multi-graph. A multi-graph can have multiple edges between the same two nodes.
- Hyper graph. A hyper graph can have edges connecting more than just two nodes.
- Property graph. Property graphs are defined as directed, labeled, attributed multi-graphs. A property graph is the common graph type supported by most graph systems. The property graph is common because modelers can express other types of graphs by simply abandoning or adding particular bits and pieces. The resource graph, modeled herein, can be considered a modified property graph.

Figure 4B:
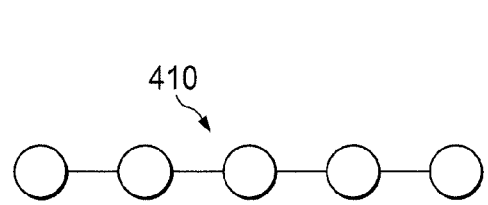
Figure 4C:
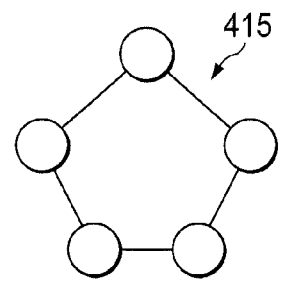

Another basic property of graphs are trees and cycles. For both, the foundation is paths $P_n$, which consist of a set of nodes {1 ..., n} and a set of edges {{1; 2}, {2; 3}, {n−1, n}} connecting these nodes. A path is therefore described as a sequence of nodes which are connected by edges between them. Following a path in a graph is called graph traversal. FIG. 4B shows the path $P_5$ (410). A cycle is a path $P_n$ for which the first and last nodes are connected by an additional edge. Cycles are named $C_n$ depending on the number of nodes they contain. FIG. 4C illustrates the cycle $C_5$ (415).

Figure 4D:
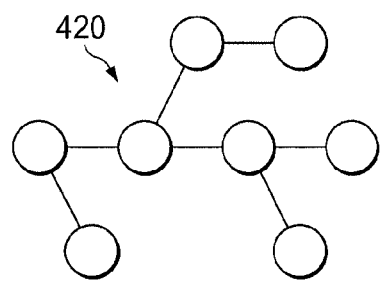
Figure 4E:
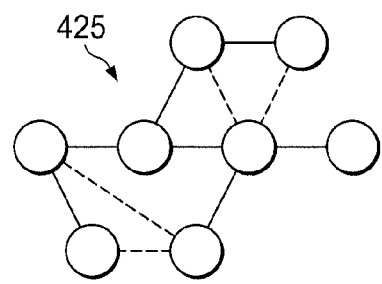

A tree is a graph that does not contain any cycles. In a tree, every edge is a bridge; otherwise, it would contain cycles. An example tree 420 is shown in FIG. 4D. Contrary to cycles and paths which can only have one form, trees can vary in shape, while keeping the number of nodes constant. A special tree is the spanning tree for a connected, undirected graph. It is a tree composed of all the nodes V in a graph and possibly, but not necessarily, all edges in E. Spanning trees will be relevant for determining bridges in complex graphs. FIG. 4E shows an example spanning tree 425. The dotted edges are not part of the spanning tree. The solid edges then form a tree which includes all nodes and is cycle-free.

Graphs can be represented in various ways to make them usable for processing and storage. Some example graph representations include matrix representations (e.g., using an adjacency matric or an incidence matrix) and list representations (e.g., object oriented lists, adjacency lists, and incident lists). In general, matrices may have the advantage of being able to have one or more algebraic operations performed on them. However, finding neighboring nodes may not be efficient, having a negative impact on graph traversal speed. List representations may provide the converse advantages and disadvantages.

As previously described, the NIMM 143 is expressed as a linked data graph connecting participants of different types, such as social, business process, and technical integration types, through message flows of different types. Additional supplemental entities in the model also exist to provide further description, including, but not limited to, Services, Groups, or BusinessTerms. To create a resource oriented architecture, the resources in the linked data graph must be identified in a consistent and logical way. To do so, the present disclosure describes creating a resource graph, which provides a resource representation of the linked data graph.

Figure 5A:
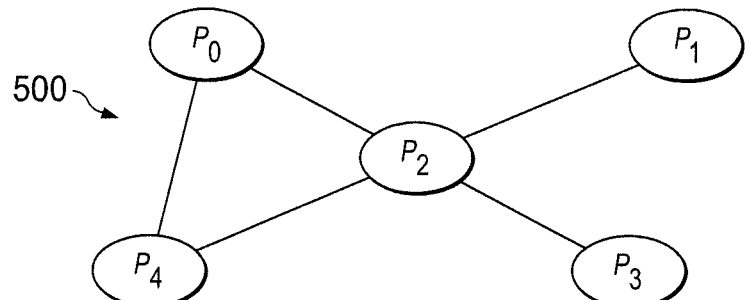
FIG. 5A illustrates an example logical graph.

In the abstract view, the linked data graph in the NIMM can be seen as a set of participants connected to each other. The linked data graph represents a high level approach for the corresponding model, and cannot generally be found in the actual data. The data represents the logical graph, which is the structure that is used to shape and create the linked data graph. An example logical graph 500 is illustrated in FIG. 5A.

This graph connects participants ($P_0$ through $P_4$) with each other. A mathematical definition of the logical graph is provided by the following:

G=(V, E)
with V={$P_0$; $P_1$; $P_2$; $P_3$; $P_4$}
and E={{$P_0$; $P_4$}, {$P_0$; $P_2$}, {$P_4$; $P_2$}, {$P_2$; $P_1$}, {$P_2$; $P_3$}}

A simple way to translate such a logical graph into resources would be to take all participants in V and all edges in E and convert them into or declare them as resources. Both nodes and edges would know about each other and be addressable as resources. However, this approach is too simplistic to be applicable to the more complex linked data graph. Therefore, the logical graph is dissolved and modified to form a suitable resource representation, the resource graph.

The first step to develop the resource graph was to introduce attributes in the logical graph. Every node in the logical graph could have an unlimited set of key-value pairs, called attributes, associated with it, for example, name, description or location. Additionally, every node was given the standard attributes of id and type, which made them identifiable. The type would always be in the most specific form. This meant that a Participant node in the linked data graph would have to use its real type, such as ApplicationParticipant or BusinessParticipantWithApplication, instead of simply Participant. The attributes associated with the resource graph in the present disclosure are those from the corresponding NIMM entities. As such, new attributes can be introduced into the model without a need for manual corrections on the resource graph. Because the logical graph is an abstract concept, the edges between the nodes are only an abstract representation of a more complicated matter. Therefore, attributes could not be directly applied for edges as they were for nodes.

Figure 5B:
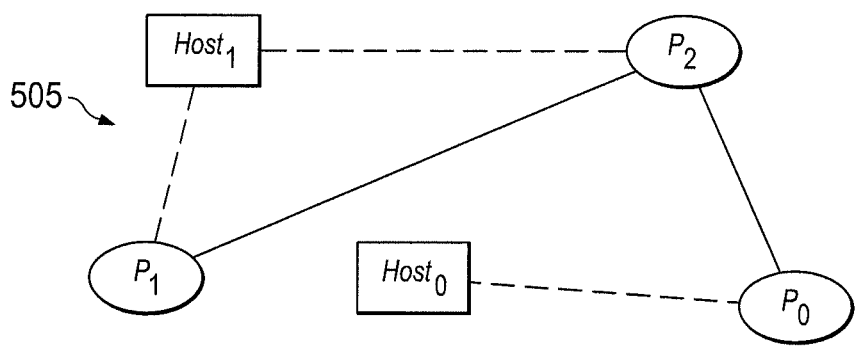
FIG. 5B illustrates an example logical graph extended by resource attributes.

The next step in creating the resource graph is to further analyze the entities that surrounded the participants. There were not only simple attributes, such as location that could be represented by a String value, but there were also other kind of attributes. These attributes, called resource attributes, referenced another resource as their value. FIG. 5B provides a logical graph 505 extended by resource attributes.

Resource attributes can be compared to 1:n relationships in relational databases. A Participant resource does have one host resource assigned for the host resource attribute, for example, $P_0$ has $Host_0$. In some instances, one host resource can be a resource attribute of many Participant resources. Consistent with the logic described above, a host resource can also have normal attributes such as an id, type, or type-specific attributes, such as a technicalName. By introducing resource attributes, the edges of the graph begin to differ in meaning While the edge between a Participant and a Host would be named host in accordance with the resource attribute name, the edges between participants could be named neighbors. In the current example, no resource attribute edge resources are defined.

Figure 5C:
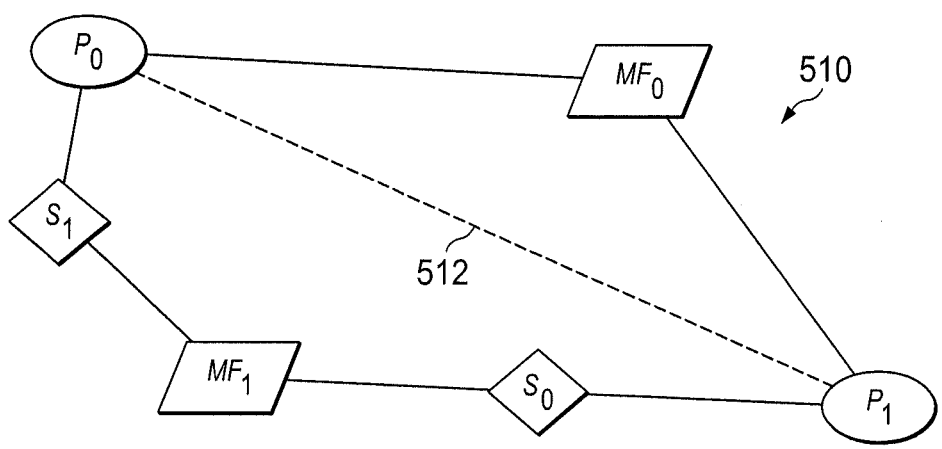
FIG. 5C depicts an illustration of an example neighbors edge on the underlying data structure of the linked data graph.

As the last step of transforming the logical graph into the resource graph, the remaining edges were dissolved. From a data structure perspective, the edge neighbors between two participants are more complex than just the illustrated line between participants. FIG. 5C depicts an illustration of an example neighbors edge on the underlying data structure of the linked data graph. The example graph 510 is a single example for illustration purposes, and could be different for any two participants.

In FIG. 5C, the dotted line 512 represents the abstract neighbors edge, the line that has been drawn as the only edge connecting two participants until now. There are also two connections between $P_0$ and $P_1$. The first connection is interrupted by the MessageFlow $MF_0$. Such a message flow could be of different types, such as P2PMessageFlow, PedestrianFlow, BusinessFlow, or MediatedFlow, among others. The second connection is even more complex, because it connects the participants with the MessageFlow $MF_1$ through Services ($S_0$; $S_1$) that the participants offer for sending or receiving messages. Because of this structure, the illustrated linked data graph can also be considered a multi-graph. A multi-graph is a graph which has multiple edges between two nodes. In this example, there are multiple edges between the two participants, $MF_0$ and $MF_1$.

To transform the abstract edges of the logical graph into resources for the resource graph, there are two fundamental possibilities. To stay consistent with the logical graph, an entity Edge could be created that incorporated all the information of all the connections between two participants. This allows the shape of the resource graph to be similar to the logical graph. Alternatively, all entities along the connections could be represented as independent resources, therefore extending the resource graph in comparison to the logical graph. In some instances, this technique may mean that the abstract edges of the logical graph would have to be abandoned and reconstructed manually. Therefore, all entities in the logical graph are therefore left as independent resources in the resource graph. By doing so, the resource graph can be parsed without knowing if a newly introduced entity was part of an edge, a participant, or simply a resource attribute. Further, for some entities, it was not certain if they should be assigned to the edge or the participant. For example, Services could be used in or associated with multiple edges, and would therefore be closer to the participant even though they are an important part of the edges. Since resource attributes are already attached implicitly without an Edge resource, a consistent approach is to make all edges implicit. Since all information was saved in the resources, the edges do not contain any attributes. Further, this approach made possible operations on the graph, filtering functions, and representations of tree structures.

Figure 5D:
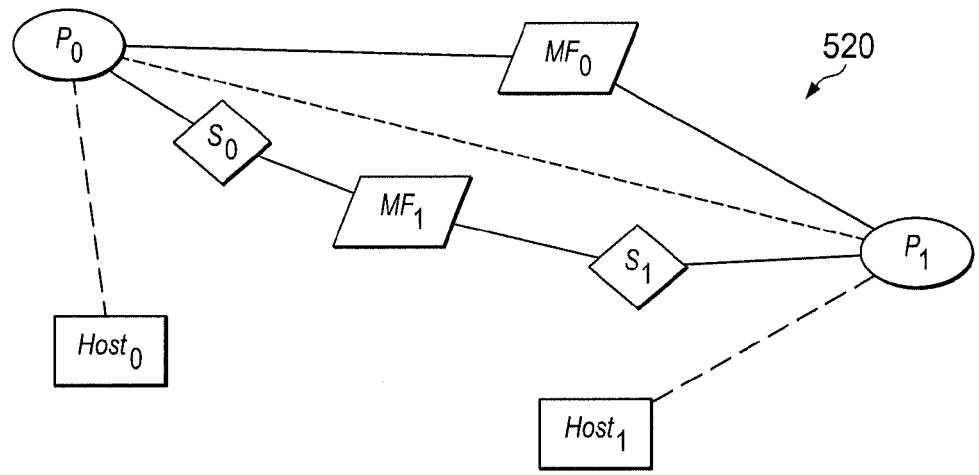
FIG. 5D depicts an example resource graph.

The final design of an example resource graph 520 is illustrated in FIG. 5D. The resource attributes $Host_0$ and $Host_1$ have previously been introduced, and they are displayed by connecting two resources through dashed lines. The straight lines, however, are now not abstract edges on the logical graph, but are instead edges in the resource graph called connections. These connections indicate that any two resources are adjacent to each other, and do not have any attributes attached to them. Connections are stored in a connection list attribute on one or both resources they touch. For example, Participant could have the connection attribute contactperson, which returns a list of all ContactPersons attached to that Participant. A ContactPerson, on the other hand, could have a list of Participants with which it is associated. These connection attributes do not have any other information attached to them and are therefore also implicit.

Figure 5E:
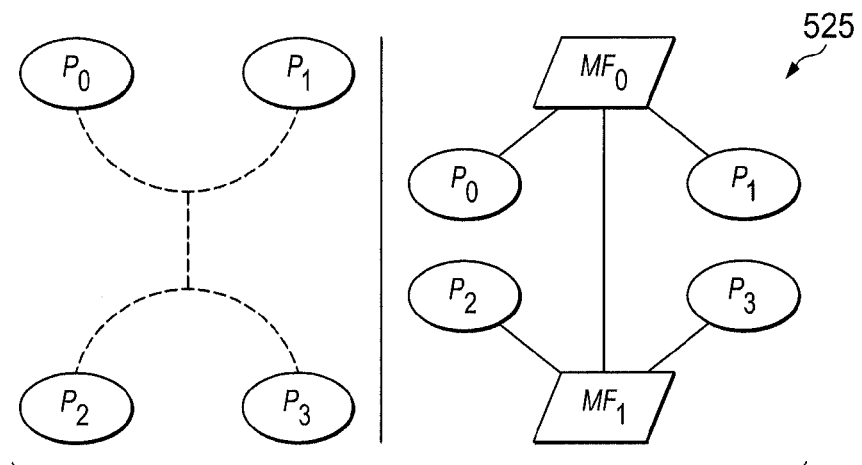
FIG. 5E depicts a second example resource graph created from a corresponding hyper graph.

This approach also solves another issue with the linked data graph 525 as illustrated by FIG. 5E. The NIMM entity MessageFlowLink can create a hyper graph out of the logical graph by linking two MessageFlows together. The left side of FIG. 5E illustrates the issue. However, using independent resources and connections, the hyper graph can be turned into a normal resource graph (as shown on right side of FIG. 5E), which makes it easier to handle. Hyper graphs are difficult to handle and interact with, since they consist of hyper edges. Hyper edges are edges between edges and do not correspond to a normal node-edge-node pattern. Hence, many common graph traversal techniques cannot handle hyper graphs. To process the graphs, they also have to transform them to a normalized representation.

Figure 5F:
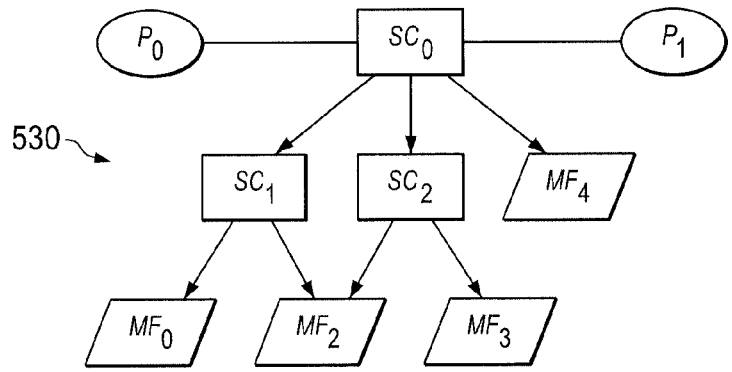
FIG. 5F illustrates an example tree structure.

Another issue with the linked data graph that had to be considered in the process of creating the resource graph are tree structures in the linked data graph. MessageFlows between two participants could be grouped together to form Sub-Conversations. The entity SubConversation could, however, also contain other SubConversations. All MessageFlows had to be part of at least one SubConversation. On top of the tree there was the top level conversation, which can be compared to the abstract edges between participants in the logical graph. However, these top level conversations are represented by ordinary SubConversation entities and are not specially marked. FIG. 5F illustrates an example tree structure 530 in the NIMM. This problem shows another advantage on the approach for the resource graph. Specifically, tree structures can be resolved as if they were a part of the normal resource graph. All resources in the tree structures have attributes such as names, resource attributes such as parent, and connections such as children. These attributes can be used to provide a resource graph-based view of the tree structure.

During creation of the resource graph, manual rules called shortcuts can be deployed that create specific connections such as a neighbor connection. These connections appear no different than normal connections found in the linked data graph. The advantage is that the resource graph, with all resources provided, can be parsed completely. Only the manually generated shortcuts might or might not work and may need to be updated manually. Shortcuts therefore create a bridge between all the information explicitly contained in the logical graph and all the information explicitly contained in the resource graph.

In some instances, metadata may be used in a generated resource graph. Since the resource graph is to be kept generic, a possible consumer of the information in the resource graph would not know what resource has which primitive attributes, resource attributes or connections associated with it. Information about the connections are called metadata. In addition to simply listing the attributes and connections, a semantic description for the attributes and connections (and other resource-related concepts) is provided by the metadata. Metadata information is the same for a resource of a specific type.

For example, every concrete instance of an ApplicationParticipant would have the same metadata information attached to it.

The resource graph, as it has been introduced, identifies every single resource in it, their attributes, and connections to further resources. This raises the question for traversal and filtering queries. For example, a user could desire the first and last names of the contact persons for all neighbors of the resource SYSTEM1. To solve this question would be to look at the neighbors connection of SYSTEM1, checking every neighbor for the attribute name of all the contact persons reachable through the contact person connection. While easy to do for small data sets and simple queries, a need to provide functionalities for handling such requests exists.

The first part of queries to the resource graph is to a base identifier. A base identifier could be: (1) a single resource identified through its id attribute, or (2) a base identifier to use a set of resources that is predefined on the resource graph under a given set name. The notation to start with a single resource as a base identifier is:

/resource.id/

For example /SYSTEM1/ would set the base identifier to the resource SYSTEM1. A result for this type of query would be all attributes associated with the resource. A common example for results associated with a base identifier using a set of predefined resources on the resource graph under a given set name would be a search result, although clustering results could also form such a base identifier set. The notation for this base identifier set includes colons surrounding the set name.

/:setName:/ where setName={$resource_1, \ldots, resource_n$}. Such a query would return all resources in the base identifier set, but only in an abstract form showing type and identifier attributes.

After determining the base identifiers, an unlimited amount of operators can be named that will be applied to them. Operators could be either connections or resource attributes on a resource. For example, an ApplicationParticipant has the operator neighbors or host that could be applied to it. Neighbors in this case is a connection (i.e., a shortcut connection), while host is a resource attribute to the ApplicationParticipant. Applying an operator on a base identifier is written as follows:

/:setName:/
-> neighbors

In the resource graph, before applying the first operator, a working set $R_0$ is created from the base identifier. This working set is then used with the first operator to form the second working set $R_1$:

$R_0$={$resource_1, \ldots, resource_n$}
$R_1$=neighbors ($R_0$)

With the working set $R_1$, the next operator could be used to form the next working set $R_2$. This would be written as:

/:setName:/
-> neighbors
-> host and it would return a working set $R_2$ with:

$R_2$=host ($R_1$)

The overall query result R of a query with m operators is formed by combining all calculated working sets $R_1$ through $R_m$. In case the base identifier is a set, the resources of $R_0$ are added to R, as well. In our example, starting with a base identifier set, R is therefore illustrated by:

$$R = \bigcup_{i=0}^{m} R_i$$

Figure 6A:
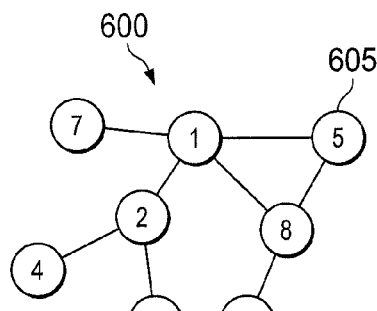
FIG. 6A illustrates an example graph.

To preserve the graph structure in the result set, R also needs to be represented as a tree structure. This raises the question of what happens to resources that show up twice in different working sets. For example, the request neighbor ({A}) returns {B}, and in the next step, when neighbor ({B}) is called the returned set is {A}. From a set theory perspective, A and B only show up once in the result set R, yet the tree perspective needs to preserve the information that A has a neighbor B and B considers A a neighbor, as well. Additional applications of the operator neighbors can cause similar results. FIG. 6A illustrates an example graph 600. For the sake of simplicity, the illustrated graph 600 does not contain any connection names or attributes on the nodes. It can therefore be assumed that all connection names are called neighbors. A sample query for this graph upon node 5 (605) could then be as follows:

/5/
-> neighbors
-> neighbors
-> neighbors
-> neighbors

Figure 6B:
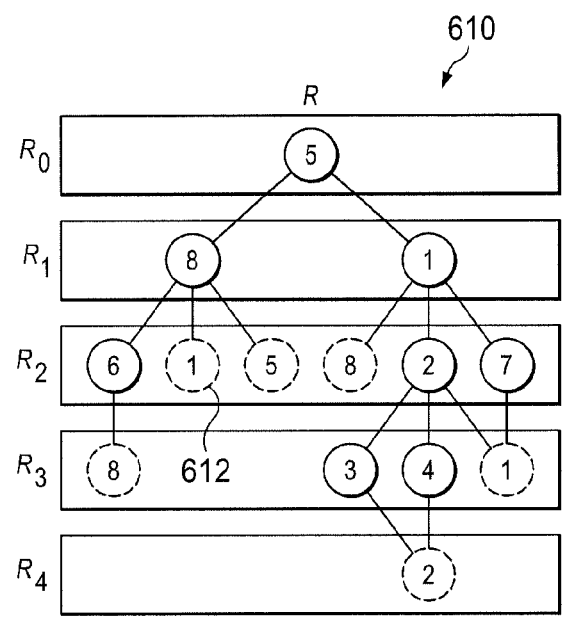
FIG. 6B illustrates an example logical graph derived from the example graph of FIG. 6A.

Starting at node 5 (605) in FIG. 6A, all neighbors, their neighbors, and so on, would be read as defined in the query. As the query is defined, the whole graph is read, meaning that the result set R would be all the nodes. FIG. 6B and graph 610 show how the query is put into the different working sets while at the same time creating the above mentioned tree structure. The working set $R_0$ is created from the base identifier, in this case, node 5. From there, the neighbors connection is used to find the next working set, consisting of 8 and 1. Moving on from $R_1$, the next neighbors are determined. At this point, nodes 1, 5 and 8 are discovered again. Since they are already part of the result set R, they are put into the tree but marked as a dead end (dashed circle 612), which eliminates them in the working set $R_2$. These steps are continued until the tree and the result set R are ready. After the evaluation of the operators, $R_0$ would have to be subtracted from R again, since the base identifier was a single node and is therefore not part of the result set. The following algorithm describes this approach more formally.

```
R := ∅
R_0 := {base identifier}
n := 0
for all connection ε operators do
    for all resource ε Rn do
        R_{n+1} := R_{n+1} ∪ resource.connection
        treeNode_{resource}.children := resource.connection
    end for
    R_{n+1} := R_n - (R ∩ R_n)
    markDeadEnd (R ∩ R_{n-1})
```

-continued $$R := R \cup R_{n+1}$$
$$n := n + 1$$
end for

After applying the operators to the base identifiers, the last part for a formalized query on the resource graph is to filter the result set. Filtering in this case means showing or not showing particular attributes on resources. Filters are applied as the last part of a query and have a ~ in front of them. A query could therefore look like this:

/:setName:/
-> operation$_0$
~ filter$_0$
~ filter$_1$

The general filtering of the resource graph is subject to the following basic rules:
  The attribute id is always shown. It is possible to filter for only the id attribute, but it is impossible to not show it.
  For dead ends of the operator result tree, only the id attribute is shown. This cannot be changed.
  If there is only a single base identifier and no further operators and filters, all attributes of the resource are displayed. Resource attributes are not resolved but only shown as the id of the resource.
  Any other case without further filtering options will return the id and type attribute on every resource. This includes all base identifier set cases, as well as cases with the use of any operators.
  All filters will be applied to all resources of the operator result set R that have the appropriate attributes. If a particular filter is not possible to apply, it will be ignored and the next filter is tried. This enables common filtering for heterogeneous operator result sets.

Starting from the default (no filters) settings, one can then start introducing filters to the query. When specifying filters, there are four types of filters that need to be considered.
  1. Filter for primitive attributes. This could be a name, an id, a type, etc. The value of the attribute is returned. If this filter is used, only the specified attributes will be returned. The only attribute that will be shown as well is the id attribute.
  2. Filter for resource attributes. This will return the filtered attribute in a resolved form. A resolved form means showing not only the id, but all attributes. For example, filtering for the host attribute on an ApplicationParticipant would return not only the id of the associated host, but return the whole host resource with all its content. Unlike for the primitive attributes, specifying a resource attribute filter does not exclude other attributes to be returned in the result.
  3. Filter for a connection. This will, similar to an operator, return all resources reachable through that connection. Like resource attributes, these resources will also be returned in a resolved way and a connection filter will not change the default behavior for showing primitive attributes.
  4. A combination or subcombination of these three. Through a dot notation, it is possible to request any attribute or connection of a resource attribute or connection. In the ApplicationParticipant example, one could specify to filter for host.id, which would return not the whole host resource, but only the id attribute of the host. This opens up possibilities to request additional resources and granular attributes in an operator like fashion.

Filters can also include at least two special filtering keywords that introduce additional functionality. The keywords are deref and meta. The deref filter sets the default for all resources in the result set R to show all available attributes by default. This is not extended to resources reached via filtering. For example, when requesting all neighbors of SYSTEM1, these neighbors would be returned with just the id and type. However, if the deref filter is used, all neighbors would be returned with all primitive and resource attributes shown. With the meta filter, metadata is switched on for every resource in the result set R. Metadata, as previously described, contains information on the attributes and connections of a resource. As with the deref filter, this only applies to resources in the result set R, not for resources that were "filtered in."

Starting from a single resource $P_0$, there are two ways to traverse to any connected resource $P_1$. Either an operator or a filter in a dot notation could be used. There are notable differences into how the two options should be applied. As previously explained, because of the dead-end determination, operators are recursion-safe. Once a resource has been added to the result, it will not be used in the next traversal iteration. On the other hand, filters can perform recusion-based traversal. If one was to filter for neighbors.neighbors.neighbors.neighbors, the original resource from which the query started would be returned twice.

Secondly, operators are type-safe, while filters are not. That means that if a non-existing connection or resource attribute is requested during an operator traversal, an error will occur. Filters, on the other hand, are applied if possible, but do not abort on failure. For example, if a non-existent connection notExist is requested on a resource via an operator, the query will abort and return with an error. If the same resource is filtered for notExist, this filter will be ignored since it is not feasible for this resource.

The third difference between operators and filters is that the special operators deref and meta can only be applied to resources that are in the operator result set. Generally, operators should be used to indicate the general traversal path through the graph. Every time a whole resource is of interest, an attempt to reach the resource via operators should be used. Filters, on the other hand, may generally be used to enhance these main resources with attributes that might not be directly attached to them.

In one implementation, the representation of the resource graph in computer memory can be done through an enhanced combination of an object oriented and an adjacency list approach as described above. Each resource may be placed into a Java object. The following illustrates an example simplified version of the corresponding Java object representing a resource:

```
class Resource {
    String id;
    String type;
    Map<String, String>> primitiveAttributes;
    Map<String, Resource> resourceAttributes;
    Map<String, List<Resource>> connections;
}
```

Since all edges are implicit through the connections and resource attributes, the simple structure can be used to represent the whole resource graph, edges included, in a generic way. This method provides the advantage of being efficiently traversable, because once a base node has been determined, the next resource of a path can be found without the need to perform a search over all resources again.

Now that the resource graph has been developed, an interface for exposing the resource graph in a RESTful manner is presented. The interface can be named the Open Business Network Interface (OBNI). The name was derived from the open and generic access it provides to the NIMM, which represents many aspects of a business network. The OBNI's protocol is HTTP, resource identification is performed by URLs, and the representation is performed by JSON. Returning to the software architecture perspective of the business trading web, the OBNI and the exposed resource graph may be placed in the same architectural layer as the NIMM itself to provide efficient and generic access. Communication within that layer may use any suitable means, including through the Apache CXF framework and the JAX-RS API.

The NIMM receives most of its information from the automatic network discovery and consolidation. The consolidation and network discovery, however, do not use the OBNI, such that most access to the NIMM will originate from clients that want to retrieve information, rather than store it. As previously described, the HTTP operation to retrieve information is the GET method. As demanded by the HTTP specification, the GET method had to be implemented in an idempotent and safe way. The representation of the resources returned by a GET operation in this implementation is JSON. The implementation of the interface, however, was generic enough to add different representations as possible results of the GET operation.

For every query to the resource graph, there were the operations on the resource graph introduced previously. From a URL perspective, the base identifier or the base identifier set is used as the first part of any URL. A resource graph query of "/SYSTEM1/" would therefore be translated to "http://localhost/SYSTEM1/" for an implementation running on a local machine. A sample query for SYSTEM1 through the HTTP protocol may be illustrated as:

```
GET /SYSTEM1/ HTTP/1.1
Host: localhost
Accept: application/json
```

An example HTTP response returning a representation of SYSTEM1 may be illustrated as:

```
HTTP/1.1 200 OK
Date: Wed, 24 Sep 2005 13:37:00 GMT
Last-Modified: Fri, 24 Jan 2003 01:23:45 GMT
Content-Length: 258
Content-Type: application/json; charset=UTF-8
[{"id":"SYSTEM1",
"type":"ApplicationParticipant",
"url":"http://localhost/SYSTEM1",
"name":"SYSTEM_MELBOURNE",
"label":"Warehouse Melbourne",
"host":"http://localhost/HOST1",
"description":"Warehouse XY in Melbourne",
"location":"Melbourne"}] GET /SYSTEM1/ HTTP/1.1
```

The JSON in the example HTTP response contains all primitive attributes and one resource attribute associated with SYSTEM1. It should be noted that the resource attribute host is not just given via the id of the host resource, but the whole URL is returned. This is to facilitate the hypermedia as the engine of application state. For the same reason, a primitive attribute url is attached to the result which contains the URL for the resource described. While this might not be useful for a single requested resource, this may become useful when multiple resources are returned later on. In some instances, the returned JSON could be received without line breaks.

Following the logic of base identifiers, base identifier sets could be used to select a number of resources at once. A query such as "/:ALLPARTICIPANTS:/" could be defined to return the set of all Participants in the resource graph. These sets could be determined statically on the server or through a search query initiated by the client. Statically determined base identifier sets were realized as search queries on the server side, mapping an identifier such as ALLPARTICIPANTS to a search query that would be processed the same way as a normal search query. Base identifier sets can be referred to as search sets. Search sets would return not only a single resource, but a list of resources with an unknown number of elements. A portion of a sample JSON for GETing the URL "http://localhost/ALLPARTICIPANTS" is provided below:

```
[
{"id":"SYSTEM1",
"type":"ApplicationParticipant",
"url":"http://localhost/SYSTEM1"
},
{"id":"SYSTEM2",
"type":"ApplicationParticipant",
"url":"http://localhost/SYSTEM2"
},
{"id":"PARTNER1",
"type":"BusinessParticipant",
"url":"http://localhost/PARTNER1"
}
]
```

Although the example resource graph includes only three participants, the general structure of the resource graph is illustrated. The resources are listed in an array and contain information on the id, type and url. Other standard base identifier sets may include allnetwork or alflows, and can be used to quickly access the resource graph. By creating new search sets, various tasks could be simplified as the base of any query could be specified so that the beginning resource set was already very close to the wanted results.

In some instances, a default base identifier may be provided. The special URL "http://localhost/" without any further arguments can be provided as a default base identifier, such as by exposing all nodes of the logical graph (Participants) for that default base identifier set. By returning all nodes, the basic network is sketched for the consumer, from which any traversal or search for specific information can be conducted. Other possibilities for the default identifier set would have included exposing a manual on how to use the OBNI, as well as a list of one or more of the preexisting search sets.

When an HTTP GET request was received, the requested URL is parsed for the first identifier from the left, which was assumed to be either a base identifier or a search set. If not predefined search set matches the HTTP GET request, the URL is considered a single base identifier. A single hash map can be used to map the id of every single resource to the corresponding resource object in memory. The hash map implementation can provide a constant-time performance for the GET and PUT operations, which makes retrieving a single base identifier very quick. Since the base identifier was the resource id, the resource is parsed into a JSON and returned to the client. Search sets included in an HTTP GET request are combined with searching functionality that goes beyond a lookup of particular id attributes.

Searching the resource graph is important in at least two user case types. The first example is a genuine search request, such as a user looking for all Hosts located in San Francisco. The other use case comprises searching through predefined search sets that could be used as base identifier sets for more complex queries. Searches can be provided in a particular search URL, such as "http://localhost/search?query=term&type=Host& . . . " The possible input various includes:

query—This argument allows for searching throughout all primitive attributes of every resource in the graph. Any kind of string could be matched, every kind of type could be returned.

type—This parameter limits the output to only the resource types specified in its comma separated list.

fields—This parameter limits the generic search through the query attribute to only the fields specified in this comma separated list.

[fieldname]—Any other argument would be assumed to be a search for a field with a specific content. For example, if one was to determine all the resources that have a location attribute that equals Sydney, one could request the URL "http://localhost/search?location=Sydney." This is a combination of the query and fields attributes, but allows for greater granularity with the search requests.

Search sets—Base identifier sets, also known as search sets, were server-side located searches that would be performed if a certain base identifier keyword was requested. For example, the URL "http://localhost/network" would trigger such a search set, which would create the same search request as if someone had manually searched for "http://localhost/search?type=ApplicationParticipant,BusinessParticipant."

During the parsing of the NIMM into the resource graph, every primitive attribute, as well as every id and type, is added to the search engine when the resources are created. When a search request is made, it is forwarded to a search backend that retrieves the corresponding data sets. From these, the id is extracted and looked up in a hash table. Then, an abstract search resource is created that has a single connection called searchresults. All result resources are added to this connection and the abstract search resource is given to the traversal algorithm with the request to follow the connection searchresults. Using this method, only the search results are shown and the abstract search resource is not displayed. Since base identifier sets were translated to ordinary search queries on the server side, the same implementation applies.

The second major function of the OBNI is the traversal of the resource graph via operators. As previously described, the translation of queries, such as:

```
/SYSTEM1/
-> neighbors
-> host
``` to URLs was achieved via the path part of a URL. A corresponding URL may be "http://localhost/SYSTEM1/neighbors/host/." The operators were added as the path and separated via forward slashes "/". A sample result of this query may be as follows:

```
[
{"id": "SYSTEM10",
"url": http://localhost/SYSTEM10",
"type": "ApplicationParticipant",
"host":
  [
  {"id": "HOST0",
  "url": "http://localhost/HOST0",
  "type": "Host"
  }
  ]
},
{id: "SYSTEM6"
"url": "http://localhost/SYSTEM6",
"type": "ApplicationParticipant"
"host": [
  {"id": "HOST0"
  }
  ]
}
]
```

As illustrated in the example result, although SYSTEM1 was requested, SYSTEM1 is not part of the result. Only the resources connected through connection neighbors and further along the traversal path are included. The neighbors in this example are SYSTEM10 and SYSTEM6. Although both have additional primitive attributes other than an id, type or nil, these attributes are not shown because it is a listing of many resources. The host attribute is shown, because the second operator specifies the connection host as the path that should be taken for every neighbor of SYSTEM1. As with SYSTEM6 and SYSTEM10, the HOST0 resource is shown with only an id, type and url. The second time HOST0 is shown as a result in the JSON, the results only provide the id, as it is determined to be a dead end at this point. Since all necessary information about the determined dead end has been sent, nothing but the id will be returned.

To implement the traversal, the URL is parsed to identify the different operators, the base identifier is obtained and the traversal is started there, and the result tree and the result sets $R_n$ are created. To parse the resulting tree structure in a JSON format, the result tree is traversed and all resources are transformed into a String containing the JSON elements. For large resource graphs, alternative methods of traversing the tree structure may be used as appropriate.

To implement filters for the OBNI, the filters were implemented as part of the URL. Since the URL path is already used for operators, filters can be implemented in a different manner. A statement such as:

```
/SYSTEM1/
~ meta
~ location
~ host.name
``` would be rewritten to a URL such as "http://localhost/SYSTEM1/?show=meta, location, host.name." The show parameter could be provided a comma separated list of filters, as shown. The special filters meta and deref could be placed in the show option, as well. A sample result of the above request could be, as follows:

```
[{"id":"SYSTEM5",
    "host":{"name":"DMU"},
    "location":"Hampton",
    "metadata":{
        "connections":{
            "neighbors":"no description yet",
            "service":"no description yet",
            "group":"no description yet",
            "flows":"no description yet"
        },
        "fields":{
            "location":{"type":"string",
                "desc":"The location of the Participant"},
            "description":{"type":"string",
                "desc":"A long description of the Participant"},
            "name":{"type":"string",
                "desc":"The name of the Participant"},
            "host":{"type":"resource",
                "desc":"The host of the Participant"}
        }
}]
```

As described in the filter rules, it is not possible to not show the id of a resource. All other attributes (e.g., host, location and metadata) were specifically requested by the query. The host.name part should be noted, because it gives an example of how the dot notation in the filters is shown in a result. Every dot creates a JSON substructure, which is a JSON object if the attribute is a resource attribute. The other possibility, which is not shown here, is to request a connection via the dot notation (for example, neighbors.name) which would return an array substructure JSON. The illustrated sample is also used to show the use of metadata. The metadata of a resource contains a list of all connections as well as a list of all fields (attributes), identifying their use and their type (string, resource).

Figure 6C:
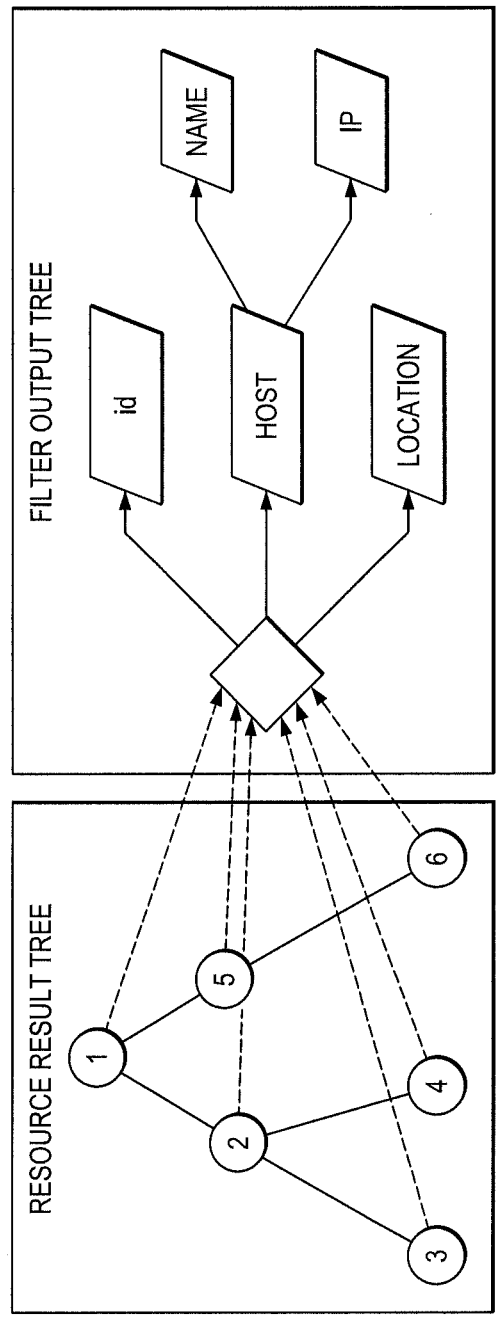
FIG. 6C depicts the example output process for a result tree and the corresponding filters.

When the URL is parsed, another tree, called the filter output tree, is parsed as well. This tree contains all attributes that should be shown, and uses children to implement the dot notation. This way, a filter a.b.c.d is merged with a filter a.b.c.e for the a.b.c part and does not create the whole output path for both filters. The output is written directly into the network stream, so a single filter cannot modify what has happened already. FIG. 6C depicts the example output process for a result tree and the corresponding filters. As FIG. 6C illustrates on the left, the result tree is traversed following the numbers 1 to 6. For every resource 1 through 6, the filter tree is applied. The id is printed, then it is checked if the resource has a connection or resource attribute called host. If so, the specified resource is obtained and checked for the attribute or connection name. After that, the same is done for the IP. Lastly, the original resource is checked for the attribute or connection location. In general, the filters are applied if possible. Because they are applied the same way to every resource, there is no guarantee that a particular filter applies, therefore an attribute that does not exist but should be filtered is not an abort condition. This is contrary to the result tree where an unknown operation causes a failure of the whole query.

Next to HTTP GET, the OBNI also implements methods that could change the resources of the resource graph. Deleting resources was implemented through the HTTP DELETE method. Only the URL of the resource was needed as an argument to this method. Generally, the DELETE method may not be applied to delete search sets, connections, or single attributes. An example HTTP DELETE request for SYSTEM1 may comprise the following request:

```
DELETE /SYSTEM1/ HTTP/1.1
Host: localhost
```

A corresponding example HTTP DELETE response after successful deletion may be represented by the following:

```
HTTP/1.1 200 OK
Date: Wed, 19 Mar 2012 09:13:22 GMT
```

Changes to existing resources is implemented with the HTTP PUT command. Similar to the DELETE request, the resource that had to be changed was specified via the URL. A PUT request is, contrary to the GET and DELETE requests, sent with a content attached. The content of the request is JSON containing the attributes and connections that should be changed for the resource. An attribute that is sent, which was not part of the resource before, produces an error. Omission of an attribute leaves the attribute unchanged in the resource graph. Every resource attribute change is checked for validity, meaning that the referenced resource must exist. The attributes id and type are not allowed to show up in the request, because they define the resource in an essential way that cannot be changed. PUTing connections is similarly done, as no additional connections could be created. The main difference is that, in some implementations, it is only possible to add new resources to a connection. Every resource specified to be PUT to a connection means adding it. If a particular resource is not mentioned in the PUT request, then is stays in the connection. In other words, deleting resources from a connection was not possible.

An example PUT request which updates SYSTEM 1 is illustrated herein:

```
PUT /SYSTEM1/ HTTP/1.1
Host: localhost
Content-Length: 97
Content-Type: application/json
{"name":"NEW_NAME",
"host":"NEWHOST",
"location":"Outer Space",
"neighbors":["SYSTEM9","SYSTEM13"]
}
```

This request updates the attributes name and location, the resource attribute host, and then adds SYSTEM9 and SYTEM13 to the neighbors connection. All other attributes and connections are left unmodified.

The last modification via the OBNI described herein is creating resources. For this operation, the HTTP POST method is used. The method works similar to the HTTP PUT, with notable differences. For example, contrary to the PUT method, the POST request does not know how the resource will be named, which means the URL cannot be directed to a special URL. Therefore, the POST request has to be sent to the base path of the OBNI, for example, "http://localhost/." Like the PUT request, the POST request contains a content body which described the resource the same way the PUT request did. The difference is that a POST request must contain the type attribute, or otherwise an error would be returned. The server would then take the request, create a resource of the given type, create an id for it, and change all the attributes to the specified attributes. If an attribute is not specified, it is left empty or with a default value, depending on the attribute. After a successful creation, the server sends a response code of 201 (Created) combined with a header called Location which contains the URL of the newly created resource.

A sample POST request and the corresponding server response are illustrated below:

```
POST / HTTP/1.1
Host: localhost
Content-Length: 129
Content-Type: application/json
{"type":"ApplicationParticipant",
"name":"NEW_NAME",
"host":"NEWHOST",
"location":"Namibia",
"neighbors":["SYSTEM9","SYSTEM13"]
}
```

The corresponding response to the HTTP POST request could be as follows:

```
HTTP/1.1 201 Created
Date: Wed, 24 Mar 2011 09:13:22 GMT
Location: /CREATEDSYSTEM1
```

The OBNI may also provide functionality for clustering. A need for clustering of networks exists as the underlying logical graph continues to grow larger. Clustering can be implemented on the server side, allowing various types of clustering. The first clustering algorithm described herein is attribute clustering. Every participant in the clustering set is put into a cluster group according to the values of a specified attribute. One example of clustering is clustering based on the location attribute. When talking about ApplicationParticipants (computers/servers), it is very likely to get a useful clustering by sorting them according to their geographic location. Therefore, all ApplicationParticipants in Melbourne, Australia could be one cluster, while another cluster would be all participants in Stuttgart, Germany. Other attributes can be used to provide for further clustering capabilities.

The second clustering algorithm is clustering by bridges, or the edges keeping two segments of a graph connected. Removing a bridge creates two separated segments that could be interpreted as clusters. The clustering by bridges algorithm looks for bridges in the graph and determines clusters accordingly. The first step in the algorithm is to determine a spanning tree T. For this task, one node can be chosen at random as the tree root. Starting from this root, the neighbor connections can be traversed while concurrently creating a tree structure. Every node that had been added to that tree is marked so it could not be included again to avoid circles. Once this algorithm stalled, a spanning tree T is created.

The second step was traversing T in preorder while at the same time numbering the nodes. Then, the number of descendants (children, children of children, etc.) for every node is determined. Additionally, every node received two attributes, L and H. L is the minimum label number (assigned during the preorder numbering in step two) of the following three components: The label number node itself, L of any child node reachable through the edges within the spanning tree, or the label numbers of the nodes reachable through edges that were not part of the spanning tree. The same system was applied for H, except that this time the maximum label number was determined.

After these three properties were set, all edges within the spanning tree were determined, for which L of the child was greater or equal to its number label and H of the child was smaller than its number label plus its number of descendants. If these two conditions are met, the edge was a bridge and would therefore separate two segments.

In order to apply clustering to the logical graph, at least two pieces of information are to be provided. The first information is the clustering algorithm(s) to be applied, and the second information is the set of nodes that should be clustered. The set of nodes is determined through the path of the URL, while the algorithms were given in the query part. To determine the sets of nodes, the concept of search sets is reused. A sample clustering URL could look as follows: "http://localhost/allparticipants?cluster=location." This example URL clusters all resources in the search set allparticipants according to their location. Since clustering was only done for Participants, a search set had to be specifically flagged that it could be clustered.

It is also possible to use multiple clustering algorithms at the same time. For example, the first level clustering could be done by determining the bridges, while the second level could be done by location. The algorithm was implemented so that the order of cluster attributes was relevant to the outcome of the clusters. If the bridge clustering puts two resources in different segments, they could be in the same location, yet they would never be joined into the same cluster again. In other words, with every additional clustering algorithm, the number of clusters could only increase.

As the mixture of clustering algorithms and the set of resources to cluster could differ for every request, clusters are created on-the-fly for every request. From a theoretical perspective, the on-the-fly idea can be interpreted as a pure form of statelessness, which is also one of the fundamental constraints of any REST interface. On the other hand, to keep things consistent with the rest of the interface, the on-the-fly created clusters are identified as resources within the OBNI as well. The clusters therefore need to have id attributes that point to the same cluster without saving the cluster in the resource graph. Special id attributes containing the parameters that would be given to the clustering engine to determine a certain cluster can be assigned to clusters. Additionally, every cluster for these parameters may be numbered. For example, cluster number 2 of the cluster algorithm with parameters algorithm=1; dataset=business, could be requested by calling the cluster engine with these two parameters. Alternatively, the cluster could be requested by using an id that contained these two variables plus the information that cluster 2 is wanted. On the server side, the id attribute can be analyzed and disassembled, with the parameters being determined and given to the clustering engine. In both cases, the result is the same.

In some instances, the encoding of the arguments into the id is performed by writing the values for the required parameters in a string and encoding the string in a BASE64 encoding. This produces a URL-compatible string that can be used as an id attribute. To identify such clustering resources, a prefix such as cluster can be added to the id. For example, the URL "http://localhost/cluster Y2x1c3Rlcjlicm1kZ2U7cGFnZT0x" illustrates this. The BASE64 encoding includes three clustering parameters, one determining the algorithm, one for the set of nodes that were clustered, and one determining which cluster number this id represents.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method performed by one or more processors for providing access to business network data, the method comprising the following operations:
    identifying a logical graph from a set of linked graph data associated with a business network to be transformed into a resource graph, the logical graph including at least two nodes and at least one edge, each edge connecting a pair of nodes, the edge defining a connection between the pair of nodes;
    converting each identified node into a resource;
    generating a resource graph associated with the identified logical graph, where generating the resource graph comprises, and for each identified node in the identified logical graph:
        associating at least one attribute associated with the identified node as a resource attribute of the corresponding resource;
        adding at least one node connected to the identified node via an edge in the identified logical graph as a resource attribute of the corresponding resource associated with the identified node; and
        dissolving at least one connection between the identified node and at least one other entity in the logical graph; and
    storing the generated resource graph in memory.

2. The method of claim 1, wherein two or more identified nodes are combined into a single resource.

3. The method of claim 1, wherein the linked data graph defines relationships between at least two networks.

4. The method of claim 3, wherein the networks include one or more of the following: a social network, a technical integration network, and a business process network.

5. The method of claim 1, wherein dissolving the at least one connection between the identified node and at least one other entity in the logical graph comprises:
    identifying a particular connection to be dissolved, where the particular connection is associated with at least one entity in connecting the identified node is associated with at least one additional entity;
    declaring at least one of the additional entities as a resource for the resource graph; and
    replacing the connection with at least one of the declared resources associated with the at least one of the additional entities.

6. The method of claim 1, further comprising providing an interface for accessing the resource graph via a request.

7. The method of claim 6, wherein the interface comprises at least one application programming interface (API).

8. The method of claim 7, where the at least one API is operable to receive and process requests for at least one of the following operations:
    traversing a set of resources in the resource graph;
    querying the resource graph based on at least one defined resource attribute search request;
    filtering query results associated with the resource graph;
    deleting at least one resource from the resource graph;
    modifying at least one attribute, resource attribute, or connection associated with at least one particular resource within the resource graph;
    creating at least one new resource within the resource graph and connecting the at least one new resource to the resource graph via at least one connection or resource attribute; and
    clustering the resource graph through at least one predefined algorithm at query-time and returning at least one temporarily-created resource based on the clustering.

9. The method of claim 8, where responses to received requests are returned in part using JavaScript Object Notation representations of at least one resource within the resource graph.

10. The method of claim 7, wherein requests received at the API define at least one resource within the resource graph for initial access.

11. A computer program product for providing access to business network data, the computer program product comprising computer readable instructions embodied on tangible, non-transitory media, the instructions operable when executed to:
    identify a logical graph from a set of linked graph data associated with a business network to be transformed into a resource graph, the logical graph including at least two nodes and at least one edge, each edge connecting a pair of nodes, the edge defining a connection between the pair of nodes;
    convert each identified node into a resource; and
    generate a resource graph associated with the identified logical graph, where generating the resource graph comprises, and for each identified node in the identified logical graph:
        associate at least one attribute associated with the identified node as a resource attribute of the corresponding resource;
        add at least one node connected to the identified node via an edge in the identified logical graph as a resource attribute of the corresponding resource associated with the identified node; and
        dissolve at least one connection between the identified node and at least one other entity in the logical graph.

12. The computer program product of claim 11, wherein two or more identified nodes are combined into a single resource.

13. The computer program product of claim 11, wherein the linked data graph defines relationships between at least two networks.

14. The computer program product of claim 13, wherein the networks include one or more of the following: a social network, a technical integration network, and a business process network.

15. The computer program product of claim 11, wherein dissolving the at least one connection between the identified node and at least one other entity in the logical graph comprises:
- identifying a particular connection to be dissolved, where the particular connection is associated with at least one entity in connecting the identified node is associated with at least one additional entity;
- declaring at least one of the additional entities as a resource for the resource graph; and
- replacing the connection with at least one of the declared resources associated with the at least one of the additional entities.

16. The computer program product of claim 11, further comprising providing an interface for accessing the resource graph via a request.

17. The computer program product of claim 16, wherein the interface comprises at least one application programming interface (API).

18. The computer program product of claim 17, where the at least one API is operable to receive and process requests for at least one of the following operations:
- traversing a set of resources in the resource graph;
- querying the resource graph based on at least one defined resource attribute search request;
- filtering query results associated with the resource graph;
- deleting at least one resource from the resource graph;
- modifying at least one attribute, resource attribute, or connection associated with at least one particular resource within the resource graph;
- creating at least one new resource within the resource graph and connecting the at least one new resource to the resource graph via at least one connection or resource attribute; and
- clustering the resource graph through at least one predefined algorithm at query-time and returning at least one temporarily-created resource based on the clustering.

19. The computer program product of claim 17, wherein requests received at the API define at least one resource within the resource graph for initial access.

20. A system comprising:
one or more computers; and
a computer-readable medium coupled to the one or more computers having instructions stored thereon which, when executed by the one or more computers, cause the one or more computers to perform operations comprising:
- identifying a logical graph from a set of linked graph data associated with a business network to be transformed into a resource graph, the logical graph including at least two nodes and at least one edge, each edge connecting a pair of nodes, the edge defining a connection between the pair of nodes;
- converting each identified node into a resource; and
- generating a resource graph associated with the identified logical graph, where generating the resource graph comprises, and for each identified node in the identified logical graph:
  - associating at least one attribute associated with the identified node as a resource attribute of the corresponding resource;
  - adding at least one node connected to the identified node via an edge in the identified logical graph as a resource attribute of the corresponding resource associated with the identified node; and
  - dissolving at least one connection between the identified node and at least one other entity in the logical graph.

* * * * *